US011890605B2

(12) United States Patent
Fairen-Jimenez et al.

(10) Patent No.: US 11,890,605 B2
(45) Date of Patent: Feb. 6, 2024

(54) COMPOSITE METAL ORGANIC FRAMEWORK MATERIALS, PROCESSES FOR THEIR MANUFACTURE AND USES THEREOF

(71) Applicant: Cambridge Enterprise Limited, Cambridge (GB)

(72) Inventors: David Fairen-Jimenez, Cambridge (GB); Tian Tian, Cambridge (GB); Joshua Mehta, Cambridge (GB); Andrew Wheatley, Cambridge (GB); Bethany Connolly, Cambridge (GB)

(73) Assignee: Cambridge Enterprise Limitd, Cambridge (GB)

( * ) Notice: Subject to any disclaimer, the term of this patent is extended or adjusted under 35 U.S.C. 154(b) by 1113 days.

(21) Appl. No.: 16/608,724

(22) PCT Filed: Apr. 27, 2018

(86) PCT No.: PCT/EP2018/060986
§ 371 (c)(1),
(2) Date: Oct. 25, 2019

(87) PCT Pub. No.: WO2018/197715
PCT Pub. Date: Nov. 1, 2018

(65) Prior Publication Data
US 2020/0179916 A1  Jun. 11, 2020

(30) Foreign Application Priority Data
Apr. 28, 2017 (GB) ...................... 1706805

(51) Int. Cl.
*B01J 35/04* (2006.01)
*B01J 35/00* (2006.01)
(Continued)

(52) U.S. Cl.
CPC ........... *B01J 35/004* (2013.01); *B01J 20/226* (2013.01); *B01J 21/063* (2013.01); *B01J 23/06* (2013.01);
(Continued)

(58) Field of Classification Search
CPC . B01D 53/04; B01J 19/24; B01J 21/30; B01J 20/06; B01J 21/06
See application file for complete search history.

(56) References Cited

U.S. PATENT DOCUMENTS

| 2010/0181212 | A1  | 7/2010 | Koch et al. |
| 2010/0209354 | A1* | 8/2010 | Horcajada-Cortes ....................... C07F 15/025 514/159 |

(Continued)

FOREIGN PATENT DOCUMENTS

| WO | WO 2010148463 | 12/2010 |
| WO | WO 2015/189599 | 12/2015 |

(Continued)

OTHER PUBLICATIONS

Buso et al., (2011) "Fast Synthesis of MOF-5 Microcrystals Using Sol-Gel SiO2 Nanoparticles", 23(4): 929-934.
(Continued)

*Primary Examiner* — Walter D. Griffin
*Assistant Examiner* — Cameron J Allen
(74) *Attorney, Agent, or Firm* — Rudy J. Ng; Bozicevic, Field & Francis LLP

(57) ABSTRACT

A monolithic metal-organic framework (MOF) composite body is disclosed, comprising: MOF crystallites adhered to each other via a binder comprising MOF; and at least 0.15 vol % nanoparticles encapsulated in the MOF body. The nanoparticles have an average particle size corresponding to an average particle diameter in the range 3-200 nm. The (Continued)

nanoparticles may have photocatalytic activity. The MOF composite body is of use for treating water containing an organic dye, the photocatalytic reaction supported by the photocatalytic nanoparticles being a degradation reaction of the organic dye.

8 Claims, 34 Drawing Sheets

(51) Int. Cl.
*B01J 20/22* (2006.01)
*B01J 21/06* (2006.01)
*B01J 23/06* (2006.01)
*B01J 23/14* (2006.01)
*B01J 23/44* (2006.01)
*B01J 23/52* (2006.01)
*B01J 35/02* (2006.01)
*B01J 35/10* (2006.01)
*B01J 37/00* (2006.01)
*C02F 1/30* (2023.01)
*C02F 1/72* (2023.01)
*C02F 101/30* (2006.01)

(52) U.S. Cl.
CPC ............... *B01J 23/14* (2013.01); *B01J 23/44* (2013.01); *B01J 23/52* (2013.01); *B01J 35/023* (2013.01); *B01J 35/1014* (2013.01); *B01J 35/1023* (2013.01); *B01J 37/0009* (2013.01); *C02F 1/30* (2013.01); *C02F 1/722* (2013.01); *C02F 2101/308* (2013.01); *C02F 2305/08* (2013.01); *C02F 2305/10* (2013.01)

(56) References Cited

U.S. PATENT DOCUMENTS

| | | | | |
|---|---|---|---|---|
| 2012/0129684 | A1* | 5/2012 | Vimont | ............ B01D 53/9413 422/177 |
| 2016/0167016 | A1* | 6/2016 | Li | ....................... C07F 7/0807 95/135 |

FOREIGN PATENT DOCUMENTS

| | | |
|---|---|---|
| WO | WO 2015189559 | 12/2015 |
| WO | WO-2017223046 A1 * | 12/2017 |

OTHER PUBLICATIONS

Chandra et al., (2015) "TiO 2 @ZIF: A Novel Approach of Modifying Micro Environment for Enhanced Photo- Catalytic Dye Degradation and High Usability of TiO2 Nanoparticles", Materials Letters vol. 164 pp. 571-573.
Chang (2017) "A "Molecule Pump" Prototype for Exceptionally High Efficiency Adsorption and Decomposition of Rhodamine B Based on the TiO2@MIL-100 Composite" Analytical Methods 9(3):381-384.
Falcaro et al., (2015) "Application of Metal and Metal Oxide Nanoparticles at MOFs", Coordination Chemistry Reviews, Elsevier Science vol. 307 pp. 237-254.
Gao et al., (2014) "The Electrochemical Performance of SnO2 Quantum Dots@Zeolitic Imidazolate Frameworks-8 (ZIF-8) Composite Material for Supercapacitors", Materials Letters vol. 128 pp. 208-211.
Jiang et al., (2009) "Au@Zif-8: CO Oxidation over Gold Nanoparticles Deposited to Metal-Organic Framework", J Am Chem Soc. 131(32):11302-11303.
Li et al., (2013) "A Synthetic Route to Ultralight Hierarchically Micro/Mesoporous Al(III)-Carboxylate Metal-Organic Aerogels", Nature Communications 4:1774, 9 pages.
Lu et al., (2012) "Imparting Functionality to a Metal-Organic Framework Material by Controlled Nanoparticle Encapsulation", Nature Chemistry vol. 4, pp. 310-316.
Mehta et al., (2018) "Sol-Gel Synthesis of Robust Metal-Organic Frameworks for Nanoparticle Encapsulation", Advanced Functional Materials 28(8): 1705588, 7 pages.
Tian et al., (2015) "Mechanically and Chemically Robust ZIF-8 Monoliths with High Volumetric Adsorption Capacity", Journal of Materials Chemistry A 3:2999-3005.
Wang et al., (2012) "Pt Nanoparticles @Photoactive Metal-Organic Frameworks: Efficient Hydrogen Evolution Via Synergistic Photoexcitation and Electron Injection", J Am Chem Soc. 134(17):7211-7214.
Ahmed et al., (2014) "Hierarchical Porous Metal-Organic Framework Monoliths," Chem. Commun. 2014, 50, 14314-14316.
Berger (2016) "Chapter 8: Traps and Interfaces in Photocatalysis: Model Studies on TiO2 Particle Systems," Royal Society of Chemistry, 185-217.
Blessi et al., (2014) "Preparation and characterization of SnO2 nanoparticles by hydrothermal method," Int. J. ChemTech Res. 6(3): 2153-2155.
Borjigin et al., (2012) "A microporpous metal-organic framework with high stability for GC separation of alcohols from water," Chem Commun., 48: 7613-7615.
Cao et al., (2001) "A Novel Method for Preparing Ordered Sno2/ Tio2 Alternate Nanoparticulate Films," Journal of Colloid and Interface Science, 244, 97-101.
Chen et al., (2014) "Facile Fabrication of Magnetically Recyclable Metal-Organic Framework Nanocomposites for Highly Efficient and Selective Catalytic Oxidation of Benzylic C—H Bonds," Chemical Communications, 61, 1-5.
Chen et al., (2014) "One-pot synthesis of Pd@MOF composites without the addition of stabilizing agents," Chem Commun, RSC, 50: 14752-14755.
Chen et al., (2014) "Synthesis of Au@ZIF-8 single- or multi-core-shell structures for photocatalysis," Chem. Commun., 50: 8651-8654.
Cravillon et al., (2011) "Controlling Zeolitic Imidazolate Framework Nano-and Microcrystal Formation: Insight into Crystal Growth by Time-Resolved In Situ Static Light Scattering," Chem Mater, 23: 2130-2141.
Dupin et al., (2000) "Systematic XPS studies of metal oxides, hydroxides and peroxides," Phys. Chem. Chem. Phys, 2: 1319-1324.
Esen et al., (2011) "Investigation of Photocatalytic Effect of SnO2 Nanoparticles Synthesized by Hydrothermal Method on the Decolorization of Two Organic Dyes," Photochemistry and Photobiology, 87: 267-274.
Fairen-Jimenez et al., (2011) "Opening the Gate: Framework Flexibility in ZIF-8 Explored by Experiments and Simulations," J. Am. Chem. Soc., 133: 8900-8902.
Fairen-Jimenez et al., (2012) "Flexibility and swing effect on the adsorption of energy-related gases on ZIF-8: combined experimental and simulation study," Dalton Trans., 41: 10752-10762.
Fuentes-Cabrera (2005) Electronic structure and properties of isoreticular metal-organic frameworks: The case of M-IRMOF1 (M=Zn, Cd, Be, Mg, and Ca) J. Chem. Phys. 123, 124713-124713-5.
Fujii et al., (1998) "Preparation and photocatalytic activites of a semiconductor composite of CdS embedded in a TiO2 gel as a stable oxide semiconducting matrix," Journal of Molecular Catalysis A: Chemical 129: 61-68.
Gao et al., (2014) "The electrochemical performance of Sno2 quantum dots@zeolitic imidazolate frameworks-8 (ZIF-8) composite material for supercapacitors," Materials Letters, 128, 208-211.
He et al., (2014) "Facile synthesis of zeolitic imidazolate framework-8 from a concentrated," Microporous and Mesoporous Materials 184: 55-60.
Horcajada et al., (2010) "Porous metal-organic-framework nanoscale carries as a potential platform for drug delivery and imaging," Nature Materials, 9: 172-178.
Houas et al., (2001) "Photocatalytic degradation pathway of methylene blue in water," Applied Catalysis B: Environmental, 31: 145-157.
Hu et al., (2011) In situ high pressure study of ZIF-8 by FTIR spectroscopy, Chem. Commun. 1-4.

(56) References Cited

OTHER PUBLICATIONS

Isimjan et al., (2010) "Photocatalytic activies of Pt/ZIF-8 loaded highly ordered TiO2 nanotubes," J. Mater Chem., 20: 10241-10245.
J. Silvestre et al., (2015) "An Overview on the Improvement of Mechanical Properties of Ceramics Nanocomposites," Hindawi, Journal of Nanomaterials, 2015: 1-13.
Jian et al., (2015) "Adsorptive removal of arsenic from aqueous solution by zeolitic imidazolate framework-8 (ZIF-8) nanoparticles," Colloids and Surfaces A: Physicochemical and Engineering Aspects, 465: 67-76.
Jing et al., (2014) "Photocatalytic Degradation of Methylene Blue in ZIF-8," RSC Advances, 1-21.
Kandola et al., Polym. Green Flame Retard. (Eds.: C.D. Papaspyrides, P. Kiliaris), Elsevier, Oxford, 2014, 503-549.
Kar et al., (2011) "Surface Defect-Related Luminescence Properties of SnO2 Nanorods and Nanoparticles," J. Phys. Chem. 115: 118-124.
Kar and Patra (2014) "Recent Development of Core-Shell SnO2 Nanostructures and Their Potential Applications," Journal of Materials Chemistry C,:1-44.
Kar et al., (2016) "Facile synthesis of SnO2—PbS nanocomposites with controlled structure for applications in photocatalysis," Nanoscale, 8: 2727-2739.
Li et al., (1997) "Study on the microstructure and properties of nanosized stannic oxide powders," Materials Chemistry and Physics, 47, 239-245.
Liu et al., (2016) "Weaving of Organic threads into a crystalline covalent organic framework," Science, 351(6271): 365-368.
Lu et al., (2012) "Imparting functionality to a metal-organic framework material by controlled nanoparticle encapsulation," Nature Chemistry, 4: 310-316.
Nasalevich et al., (2014) "Metal-organic frameworks as heterogeneous photocatalysts: advantages and challenges," CrysEngComm, 16: 4919-4926.
Rochester and Yong (1980) "Infrared Study of the Adsorption of Amines on Silica Immersed in Carbon Tetrachloride," J.C.S. Faraday I, 76: 1158-1165.
Serpone and Salinaro (1999), "Terminology, relative photonic efficiencies and quantum yields in heterogeneous photocatalysis. Part I: Suggested protocol," Pure & Appl. Chem., 71(2), 303-320.
Shen et al., (2005) "Immobilization of ionic liquid with polyeletrolyte as carrier," Chem. Commun., 4193- 4195.
Sun et al., (2016) "Electrically Conductive Porous Metal-Organic Frameworks," Angew. Chem. Int. Ed., 55, 3566-3579.
Tan et al., (2010) "Chemical structure, network topology, and porosity effects on the mechanical properties of Zeolitic Imidazolate Frameworks," PNAS, 107(22): 9938-9943.
Tan et al., (2011) "Hydrothermal Synthesis of SnO2 Nanostructures with Different Morphologies and Their Optical Properties," Hindawi, Journal of Nanomaterials, 2011: 1-10.
Tan et al., (2012) "Exceptionally Low Shear Modulus in a Prototypical Imidazole-Based Metal-Organic Framework," PRL, 108, 095502-095502-6.
Tian et al., (2012) "Cost-effective large-scale synthesis of ZnO photocatalyst with excellent performance for dye photodegradation," Chem. Commun. 48: 2858-2860.
Vasconcelos et al., (2012) Cytotoxicity and slow release of the anti-cancer drug doxorubicin from ZIF-8, RSC Advances, 2: 9437-9442.
Vinu and Madras (2010) "Environmental remediation by photocatalysis," Journal of the Indian Institute of Science 90(2): 189-230.
Wang et al., (2002) "Preparation and characterization of SnO2 nanoparticles with a surfactant-mediated method," Nanotechnology, 13: 565-569.
Wang et al., (2011) "Hybird Zeolitic Imidazolate Frameworks with Catalytically Active TO4 Building Blocks," Angew. Chem., 123: 470-473.
Wang et al., (2013) "Assembly of ZIF nanostructures around free Pt nanoparticles: efficient size-selective catalysts for hydrogenation of alkenes under mild conditions," RSC Publishing, Chem. Commun . . . 49: 3330-3332.
Williamson and Hall (1953) "X-ray Line Broadening From Filed Aluminium and Wolfram," Acta Metallurgica, 1(1): 22-31.
Wu et al., (2009) "Amino Acid-Assisted Hydrothermal Synthesis and Photocatalysis of SnO2 Nanocrystals," J. Phys. Chem. C, 113: 17893-17898.
Xu et al., (2008) "SnO2 Quantum and Quantum Wires: Controllable Synthesis, Self-Assembled 2D Architectures, and Gas-Sensing Properties," J. Am. Chem. Soc., 130, 12527-12535.
Zahmakiran, (2012) "Iridium nanoparticles stabilized by metal organic frameworks (IrNPs@ZIF-8): synthesis, structural properties and catalytic performance," Dalton Trans., 41: 12690-12696.
Zhang and Gao (2004) "Synthesis and characterization of nanocrystalline tin oxide by sol-gel method," Journal of Solid State Chemistry, 177, 1425-1430.
Zhao et al., (2013) "Selective anion exchange with nanogated isoreticular positive metal-organic frameworks," Nature Communications, 1-9.
Zuo et al., (2014) "Photocatalytic Degradation of Methylene Blue Using TiO2 Impregnated Diatomite," Hindawi, Advances in Materials Science and Engineering, 2014, 1-7.
Cambridge Enterprise Limited (2020) 18 720 618.0-1101 Communication pursuant to Article 94(3) EPC pp. 1-11.
Cambridge Enterprise Limited (2018) PCT/EP2018/060986 International Search Report, pp. 1-25.
Cambridge Enterprise Limited (2017) GB1706805.7 Search Report, pp. 1-3.

* cited by examiner

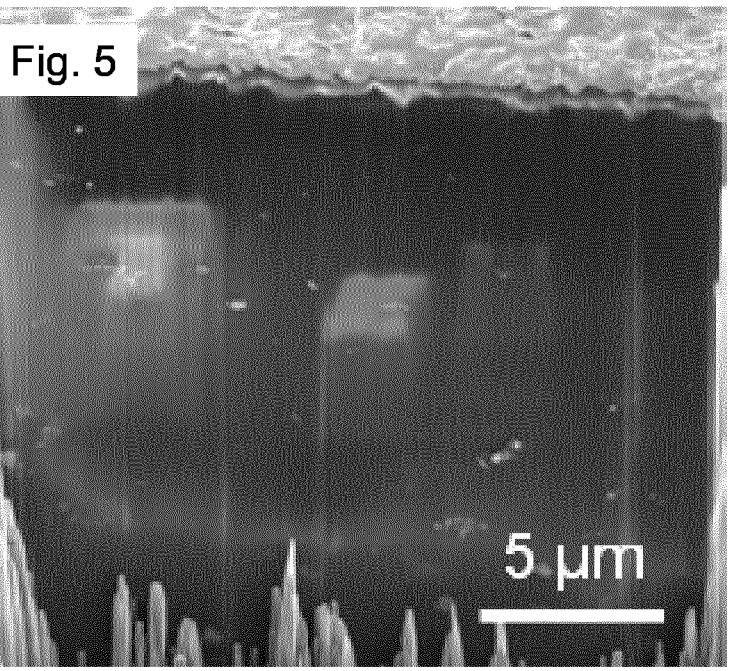
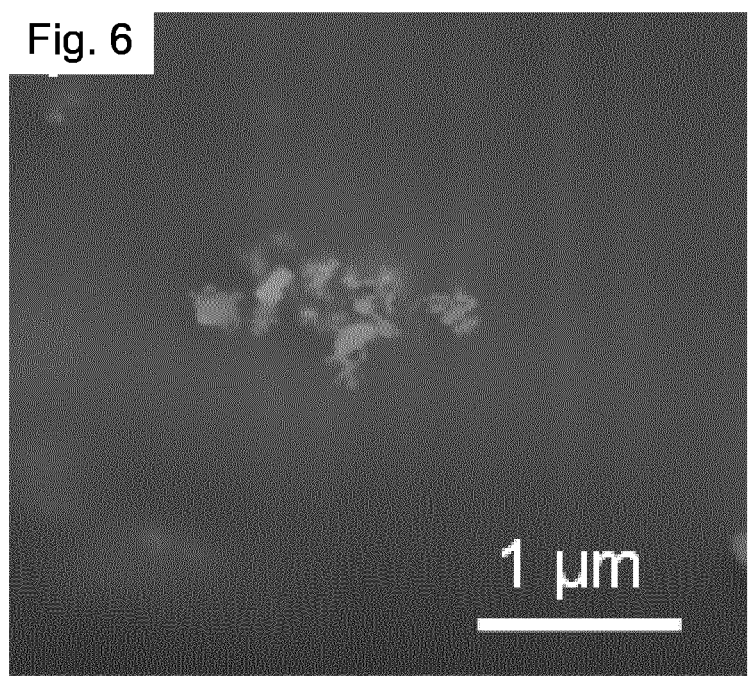

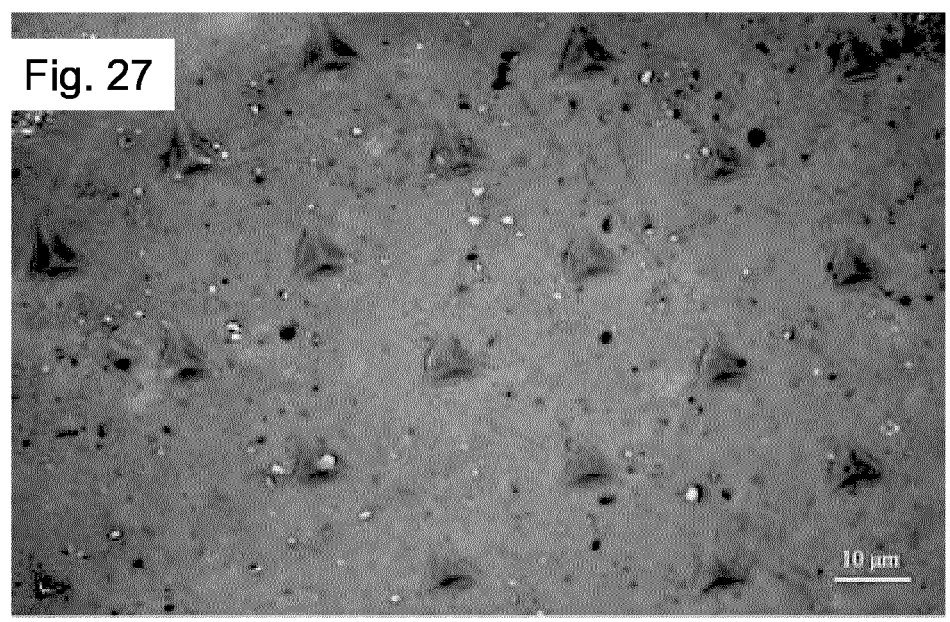

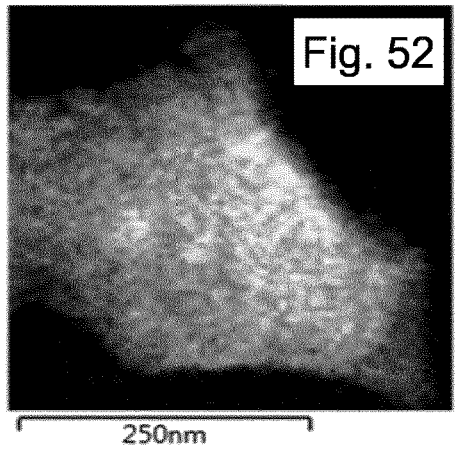
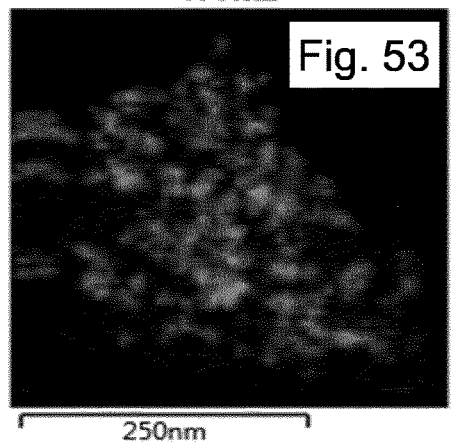
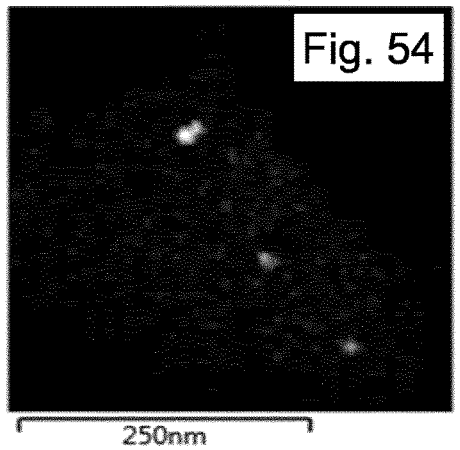
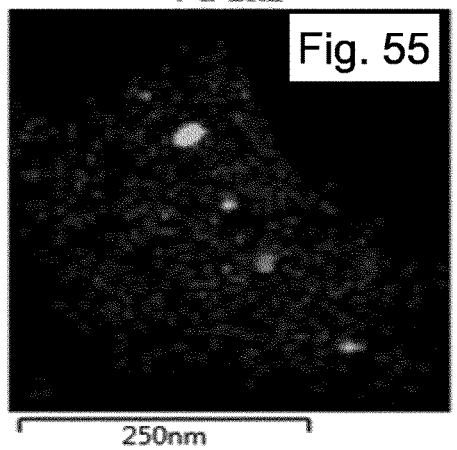

COMPOSITE METAL ORGANIC FRAMEWORK MATERIALS, PROCESSES FOR THEIR MANUFACTURE AND USES THEREOF

BACKGROUND TO THE INVENTION

Field of the Invention

The present invention relates to composite metal organic framework (MOF) materials, processes for the manufacture of such materials and to the uses of such materials. The invention has particular, but not exclusive, applicability to the deployment of photocatalytic materials for treatment of water.

Related Art

Metal-organic frameworks (MOFs) are porous crystalline materials prepared by the self-assembly of metal ions and organic ligands. MOFs can have large pore volumes and apparent surface areas as high as 8,000 $m^2$/g. MOFs combine a structural and chemical diversity that make them attractive for many potential applications, including gas storage, gas separation and purification, sensing, catalysis and drug delivery. The most striking advantage of MOFs over more traditional porous materials is the possibility to tune the host/guest interaction by choosing the appropriate building blocks, i.e. the metal ions and organic ligands, from which the MOF is formed.

WO 2010/148463 discloses a method for synthesis of MOFs in which the synthesis conditions are mild—typically below 30° C.—and the synthesis proceeds relatively quickly—typically in less than 1 hour. The synthesis takes place in a mixture of water and ethanol. The material studied in WO 2010/148463 is $Cu_3(BTC)_2$-type MOF.

US 2010/0181212 discloses MOF materials supported on open cell polymer foam structures, for use in gas storage applications.

Related work from the present inventors' research group has been published as WO 2015/189599. In WO 2015/189599, there is disclosed a process for manufacturing a MOF body comprising MOF crystallites adhered to each other via a MOF binder, that it, a binder that is formed of MOF. In one embodiment, the body consists of: MOF crystallites; a MOF binder which binds the crystallites together in the body; optionally, residual solvent; and optionally, one or more additives, wherein the additives are present at a level of not more than 10% by mass. WO 2015/189599 has one embodiment in which the MOF binder has substantially the same composition as the MOF crystallites.

WO 2015/189599 has another embodiment in which the MOF binder has a different composition to the MOF crystallites.

SUMMARY OF THE INVENTION

The present inventors have realized that functional nanoparticles may benefit from encapsulation in a MOF material. This may allow the exploitation of the combined physico-chemical properties of both constituents [Ref. 10]. However, to the best of the inventors' knowledge, there are no reports of nanoparticle encapsulation that provides a suitable monolithic composite (NP@$_{mono}$MOF) by a cost-effective process. Previous attempts to exploit the properties of MOFs for environmental remediation, for example, have focused on powdered morphologies, with their ability to degrade toxic organic compounds being poor [Ref. 11].

The present invention has been devised in order to address at least one of the above problems. Preferably, the present invention reduces, ameliorates, avoids or overcomes at least one of the above problems.

Accordingly, in a first preferred aspect, the present invention provides a monolithic metal-organic framework (MOF) composite body comprising:
  MOF crystallites adhered to each other via a binder comprising MOF;
  at least 0.15 vol % nanoparticles encapsulated in the MOF body, the nanoparticles having an average particle size corresponding to an average particle diameter in the range 3-200 nm.

In a second preferred aspect, the present invention provides a monolithic metal-organic framework (MOF) composite body consisting of:
  MOF crystallites;
  a binder formed of MOF which binds the MOF crystallites together in the body;
  at least 0.15 vol % nanoparticles encapsulated in the MOF body, the nanoparticles having an average particle size corresponding to an average particle diameter in the range 3-200 nm;
  optionally, residual solvent; and
  optionally, one or more additives, wherein the additives are present in an amount of not more than 10% by mass of the composite body.

In a third preferred aspect, the present invention provides a population of MOF composite bodies according to the first or second aspect.

In a fourth preferred aspect, the present invention provides a process for manufacturing a monolithic metal-organic framework (MOF) composite body, the process comprising the steps:
  providing MOF precursors;
  providing nanoparticles having an average particle size corresponding to an average particle diameter in the range 3-200 nm;
  providing at least one solvent;
  allowing the reaction of the MOF precursors in the solvent in the presence of the nanoparticles;
  carrying out a drying stage with a maximum temperature in the drying stage of not more than 80° C. to form a monolithic MOF composite body comprising MOF crystallites adhered to each other via a binder comprising MOF, and incorporating at least 0.15 vol % of the nanoparticles encapsulated in MOF.

In a fifth preferred aspect, the present invention provides a method for treating water, the method comprising:
  contacting a MOF composite body according to the first or second aspect or a population of MOF composite bodies according to the third aspect with water to be treated, the nanoparticles being photocatalytic nanoparticles; and
  allowing the MOF composite bodies in contact with the water to be treated to be subjected to electromagnetic radiation suitable for activating at least one photocatalytic reaction supported by the photocatalytic nanoparticles.

In a sixth preferred aspect, the present invention provides a method for treating fluid, the method comprising contacting a MOF composite body according to the first or second aspect or a population of MOF composite bodies according to the third aspect with fluid to be treated, the nanoparticles interacting with the fluid to be treated.

The first, second, third, fourth, fifth and/or sixth aspect of the invention may have any one or, to the extent that they are compatible, any combination of the following optional features.

Preferably, the binder comprising MOF is formed substantially only of MOF. Preferably, for example, the binder comprising MOF consists of 100% MOF.

In the composite body, the nanoparticles may be provided in an amount of at least 0.2 vol %, or at least 0.25 vol %, or at least 0.3 vol %, or at least 0.35 vol %, or at least 0.4 vol %, or at least 0.45 vol %, or at least 0.5 vol %, based on the volume of the composite.

The nanoparticles may be present in the composite in an amount of at most 1 vol %, based on the volume of the composite. Although it is preferred to include as much volume of nanoparticles in the composite as possible, typically to enhance a functional effect provided by the nanoparticles in the composite body, it is found that at higher concentrations, sedimentation of the nanoparticles may take place during synthesis of the composite body.

In the process for manufacturing the composite body, the maximum temperature in the drying stage may be not more than 70° C., more preferably not more than 60° C., more preferably not more than 50° C. The temperature during the drying stage is typically selected according to the MOF composition of interest. It is typically found that gentle conditions during the drying stage promote the formation of suitable monolithic composite bodies.

In some preferred embodiments, the nanoparticles are photocatalytic nanoparticles. Such nanoparticles are of interest in order to promote certain chemical reactions, in particular under illumination. Preferably, the relative photonic efficiency $\xi_r$ of the nanoparticles is greater than 1. Further discussion of this feature is set out further below.

In some preferred embodiments, the nanoparticles comprise a composition selected from the group consisting of one or a combination of:
 metal oxides, including $SnO_2$, ZnO, $TiO_2$, PdO
 Pd, Au, Ru, Rh, Pt,
 Bi-containing compositions, including $BiFeO_3$, $Bi_2S_3$, $BiVO_4$ and $Bi_2Fe_3O_9$
 Cd-containing materials, including CdSe and CdS
 transition metal dichalcogenides, including $MoS_2$ and $WS_2$.

The nanoparticles may comprise at least two different materials having a heterojunction interface between them.

In the case of photocatalytic nanoparticles, it may be preferred to use a material with a relatively narrow bands gap in order to utilize the solar spectrum more effectively.

Due to electron-hole recombination, it is understood that many of the materials listed rarely appear alone and typically form a heterojunction with a different material, extending excitation lifetime. 2 component and 3 component nanoparticles are of interest. Examples of 2 component systems include core@shell NPs like $Bi_2S_3$@$MoS_2$ or CdSe@$MoS_2$. Examples of 3 component systems include $Bi_2S_3$@$MoS_2$/$TiO_2$ or CdSe@$MoS_2$/$TiO_2$ or Au@PdO/$TiO_2$ nanocomposites.

Preferably, the smallest dimension of the composite body is at least 10 μm. It is considered that the composite body should be a self-supporting body, and therefore is typically not formed as a film or layer on a substrate. The smallest dimension of the composite body may be at least 50 μm, at least 100 μm, at least 200 μm, at least 500 μm, at least 1 mm, at least 2 mm, or at least 5 mm. The composite body preferably takes the form of a monolith.

The composite body may have a BET surface area of at least 500 $m^2g^{-1}$. It is understood that this is still a substantial surface area compared with typical materials. However, it is relatively low for a MOF material. The incorporation of (typically non-porous) nanoparticles into the MOF reduces the available surface area per unit weight of the composite body. The composite body may have a BET surface area of at least 600 $m^2g^{-1}$, at least 700 $m^2g^{-1}$, or at least 800 $m^2g^{-1}$. The MOF material itself (without the incorporation of nanoparticles) typically has a higher BET surface area than the composite body, e.g. at least 900 $m^2g^{-1}$.

The nanoparticles, when isolated from the MOF composite body, may have a BET surface area of at most 100 $m^2g^{-1}$. Thus, the nanoparticles themselves are not microporous. Thus, the nanoparticles, when isolated from the MOF composite body, may alternatively have a BET surface area of at most 50 $m^2\ g^{-1}$, or at most 10 $m^2\ g^{-1}$.

In some preferred embodiments, the MOF comprises a zeolitic imidazolate framework (ZIF).

The MOF may, for example, comprise one or more materials selected from the group consisting of:
 ZIF-8, HKUST-1, UiO-66, MOF-74, Al-fumarate, NU-1000, MIL-100, MIL-53.

For reference, the chemical compositions for these materials can be expressed as:
 ZIF-8: $C_8H_{10}N_4Zn$
 HKUST-1: $C_{18}H_6Cu_3O_{12}$
 UiO-66: $C_{48}H_{28}O_{34}Zr_6$
 MOF-74: $C_8H_2O_6X_2$(X=Zin, Co, Ni, Mg, Fe, Mn, Cu)
 Al-fumarate: $C_4H_{10}O_{8.5}Al$
 NU-1000: $C_{88}H_{64}O_{32}Zr_6$
 MIL-100: $C_{18}O_{14}H_7Fe_3$ (X=Al, Fe, Cr)
 MIL-53: $C_8H_5O_5X$ (X=Al, Fe, Cr)

In the process, the drying stage may be carried out in a mould so that the composite body is formed to conform to an internal shape of the mould.

In terms of the method of treatment of water using the composite body, the water to be treated may contain an organic dye. Preferably, the photocatalytic reaction supported by the photocatalytic nanoparticles is a degradation reaction of the organic dye. The organic dye may, for example, be one or a combination of organic dyes selected from the group consisting of:
 eosin dyes, rhodamine dyes, xanthene dyes, fluorescein dyes, acridine dyes, anthraquinone dyes, azo dyes, diazonium dyes, fluorine dyes, fluorone dyes, phthalocyanine dyes.

For water treatment, it is preferred that the nanoparticles comprise, for example, a composition selected from the group consisting of one or a combination of:
 metal oxides, including $SnO_2$, ZnO, $TiO_2$,
 Bi-containing compositions, including $BiFeO_3$, $Bi_2S_3$, $BiVO_4$ and $Bi_2Fe_3O_9$
 Cd-containing materials, including CdSe and CdS
 transition metal dichalcogenides, including $MoS_2$ and $WS_2$.

Preferably, the electromagnetic radiation to which the composite bodies are subjected is natural sunlight or artificial sunlight.

Where the composite body is used to treat a fluid, the fluid to be treated may comprise CO. In that case, preferably the nanoparticles may comprise, for example, Au, the CO being treated by being oxidised.

Where the composite body is used to treat a fluid, the fluid to be treated may comprise hydrogen. In that case, prefer ably the nanoparticles may comprise, for example, one or more of:

Ru, Ru/Rh, Pt, Pd resulting in a hydrogenation reaction.

Where the composite body is used to treat a fluid, the fluid to be treated may comprise water. In that case, the nanoparticles may comprise Ru, resulting in a hydration reaction.

Where the composite body is used to treat a fluid, the fluid to be treated may comprise methane. In that case, the nanoparticles may comprise, for example, one or more of:

PdO/Au/TiO$_2$ or Au@PdO/TiO$_2$ resulting in a methane oxidation reaction to form methanol.

Where the composite body is used to treat a fluid, the fluid to be treated may comprise water. In that case, the nanoparticles may comprise, for example, Pt, resulting in the formation of hydrogen and oxygen.

Further optional features of the invention are set out below.

BRIEF DESCRIPTION OF THE DRAWINGS

Embodiments of the invention will now be described by way of example with reference to the accompanying drawings in which:

FIGS. 3-6 show SEM micrographs of SnO$_2$@$_{mono}$ZIF-8 upon FIB milling, with the sample at 52° tilt. Bright rectangular areas and vertical curtaining are due to localized charging under the electron beam and artefacts caused by milling, respectively. FIG. 6 reveals embedded SnO$_2$—NPs (f).

against $$\frac{\sin\theta}{\lambda}$$

for SnO$_2$ nanoparticles prepared using a hydrothermal method.

Figure 14:
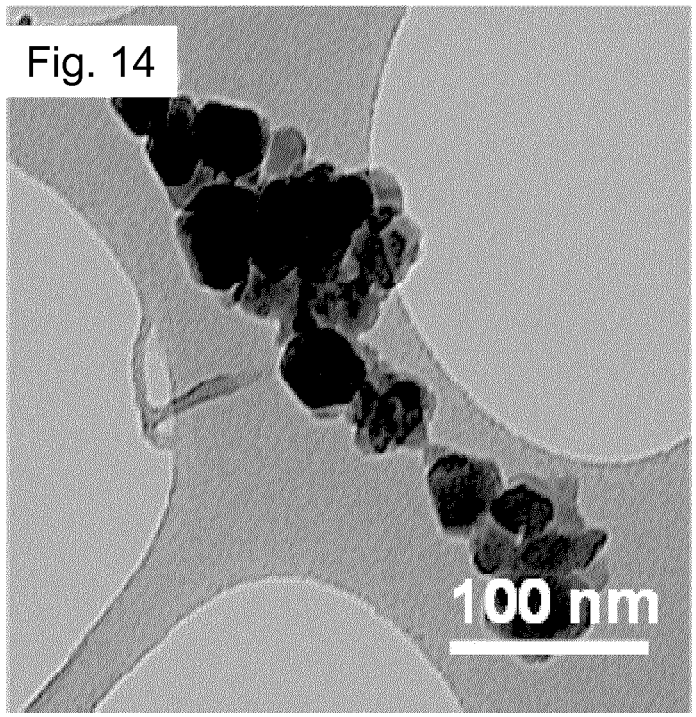
Figure 15:
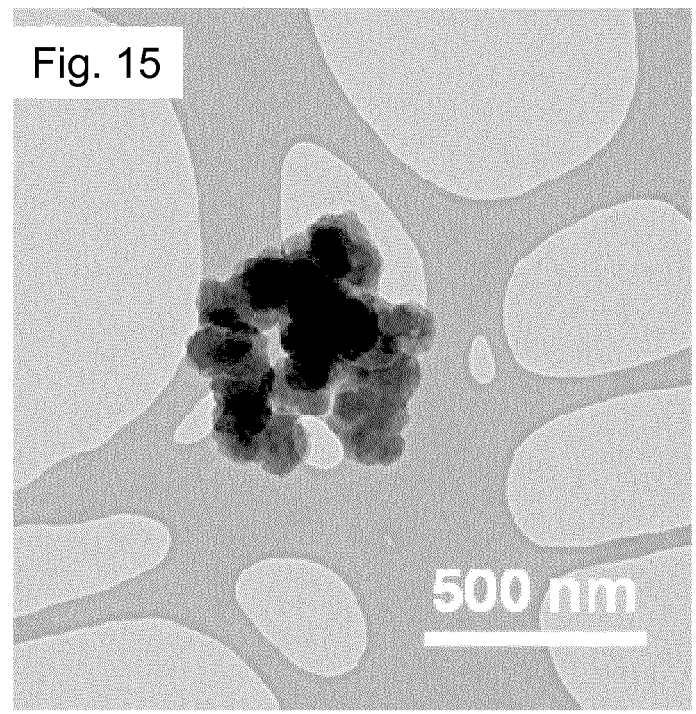

FIGS. 14 and 15 show representative TEM micrographs of the mother liquors associated with the preparation of $_{mono}$ZIF-8 (FIG. 14) and SnO$_2$@$_{mono}$ZIF-8 (FIG. 15) taken at 15 minutes reaction time.

Figure 16:
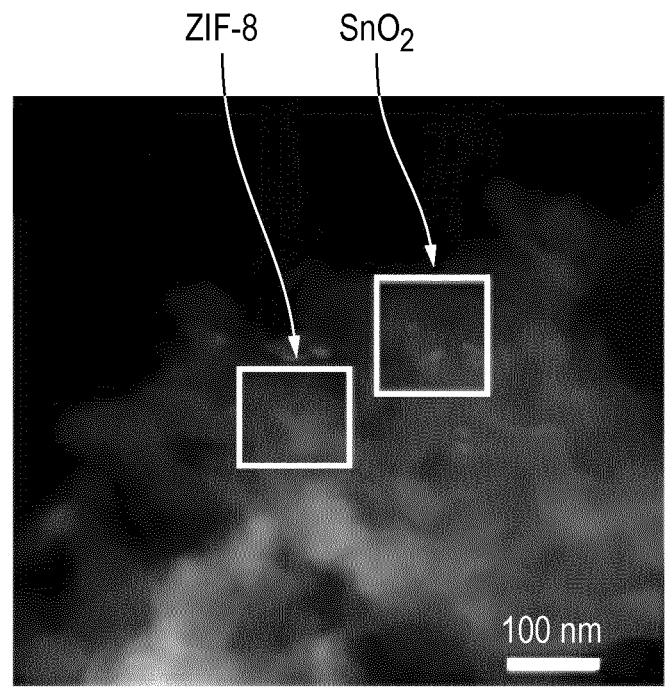
Figure 17:
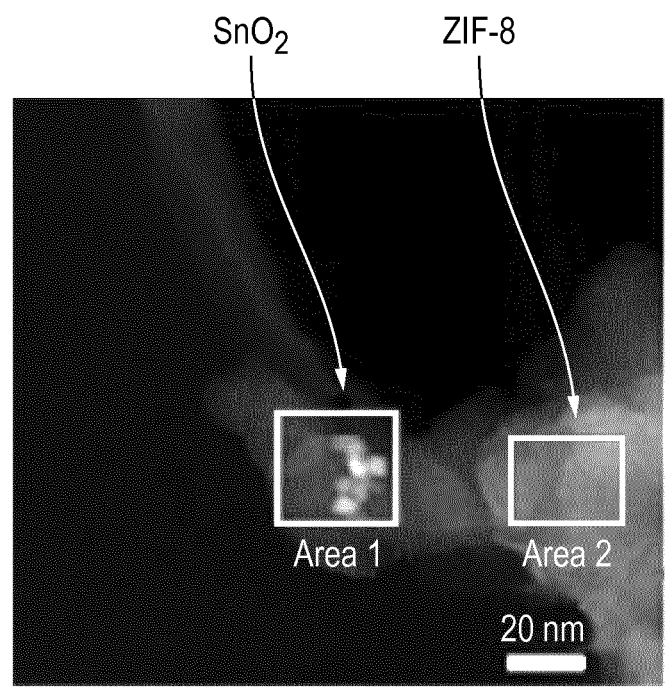

FIGS. 16 and 17 show representative STEM-HAADF images of SnO$_2$@$_{mono}$ZIF-8 (scale bar 100 nm in FIG. 16 and scale bar 20 nm in FIG. 17).

Figure 18:
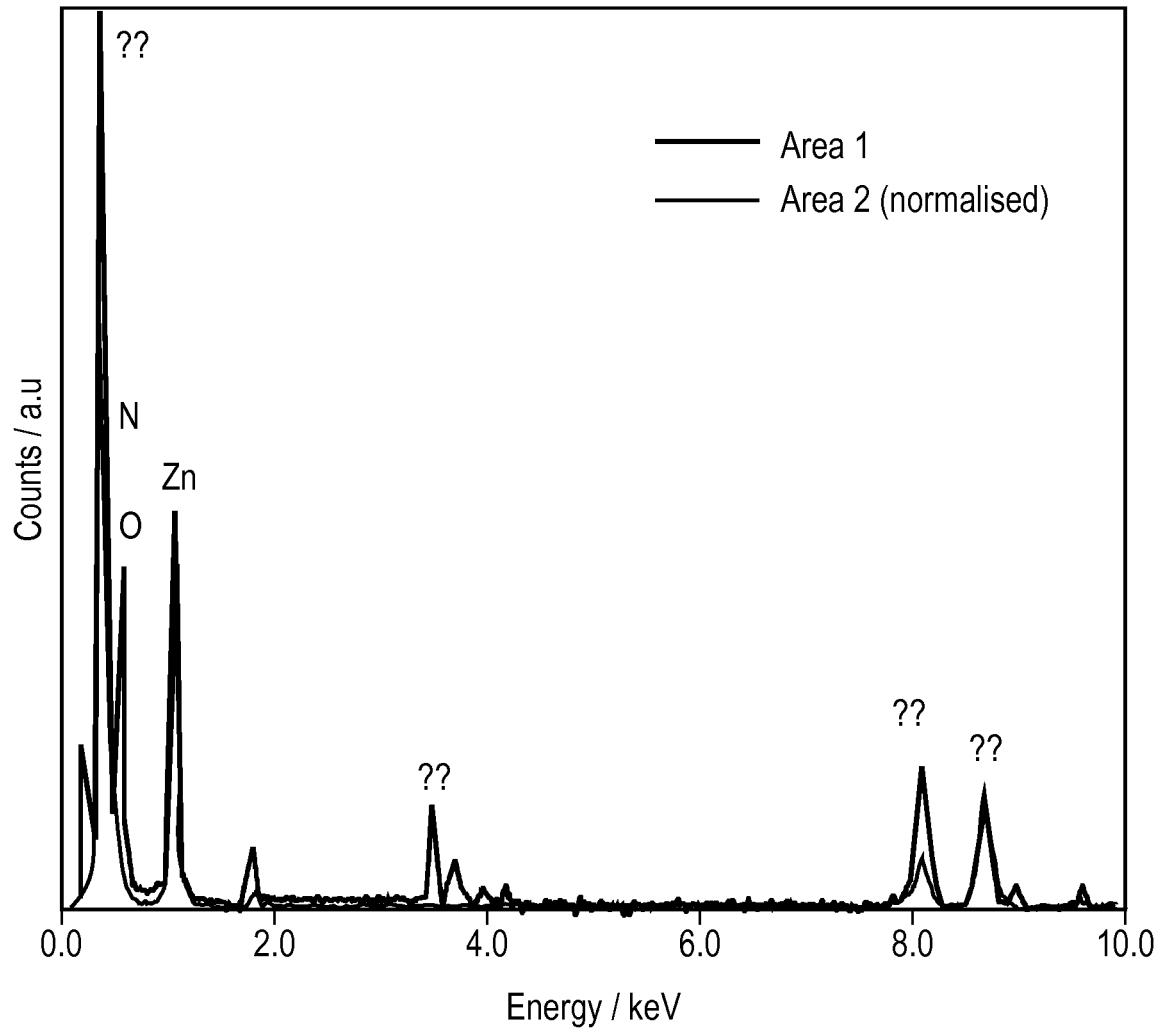

FIG. 18 shows drift corrected EDX analysis of SnO$_2$@$_{mono}$ZIF-8, scanned over Area 1 (blue) and Area 2 (red) as illustrated by the regions identified in FIG. 17.

Figure 19:
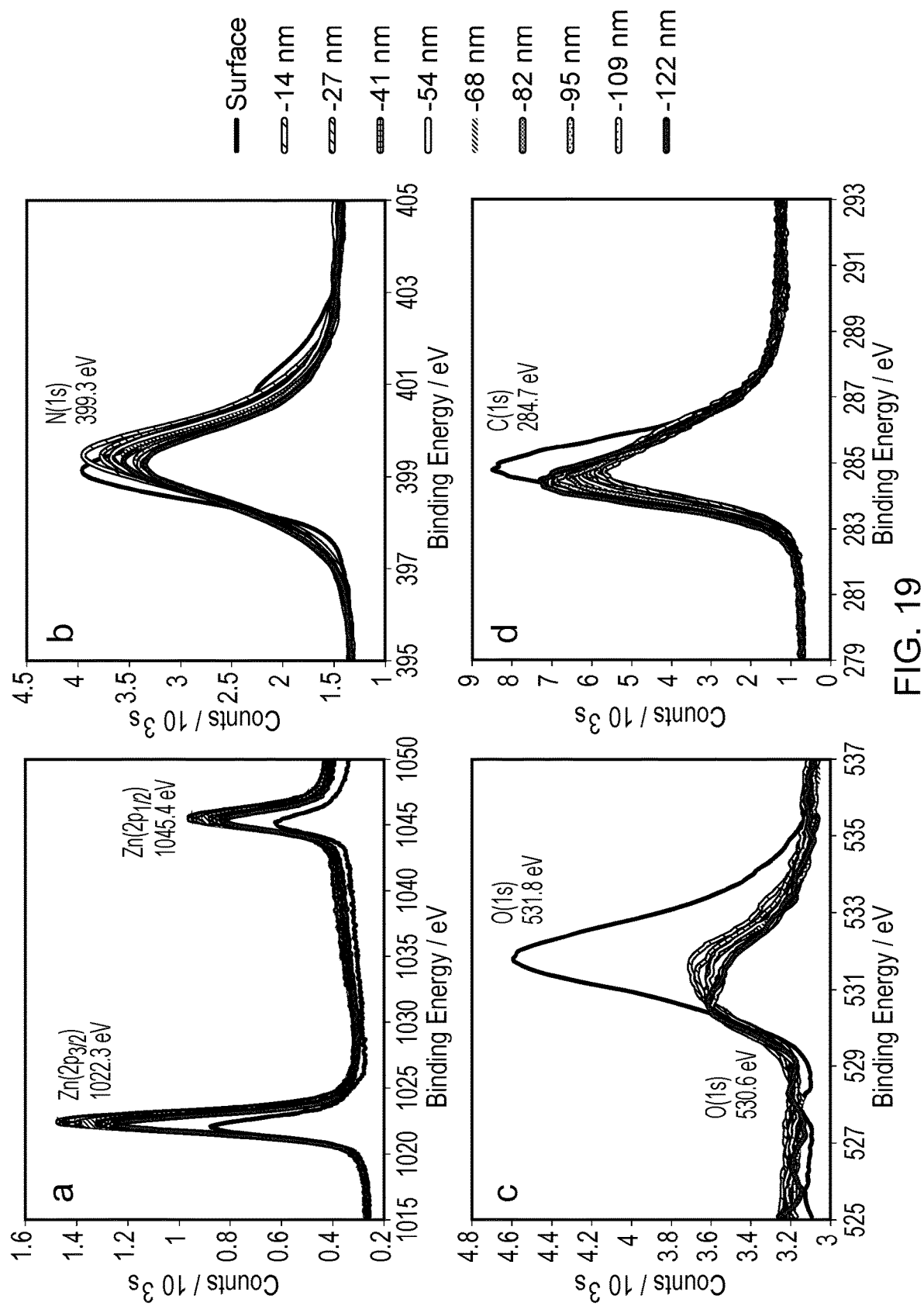

FIG. 19 shows selected FIB-XPS data for Zn (marked as a), N (marked as b), O (marked as c) and C (marked as d) for etched layers of SnO$_2$@$_{mono}$ZIF-8. The etching depth is indicated below the graphs of FIG. 19. The peak energies calculated as an average over the 10 spectra.

Figure 20:
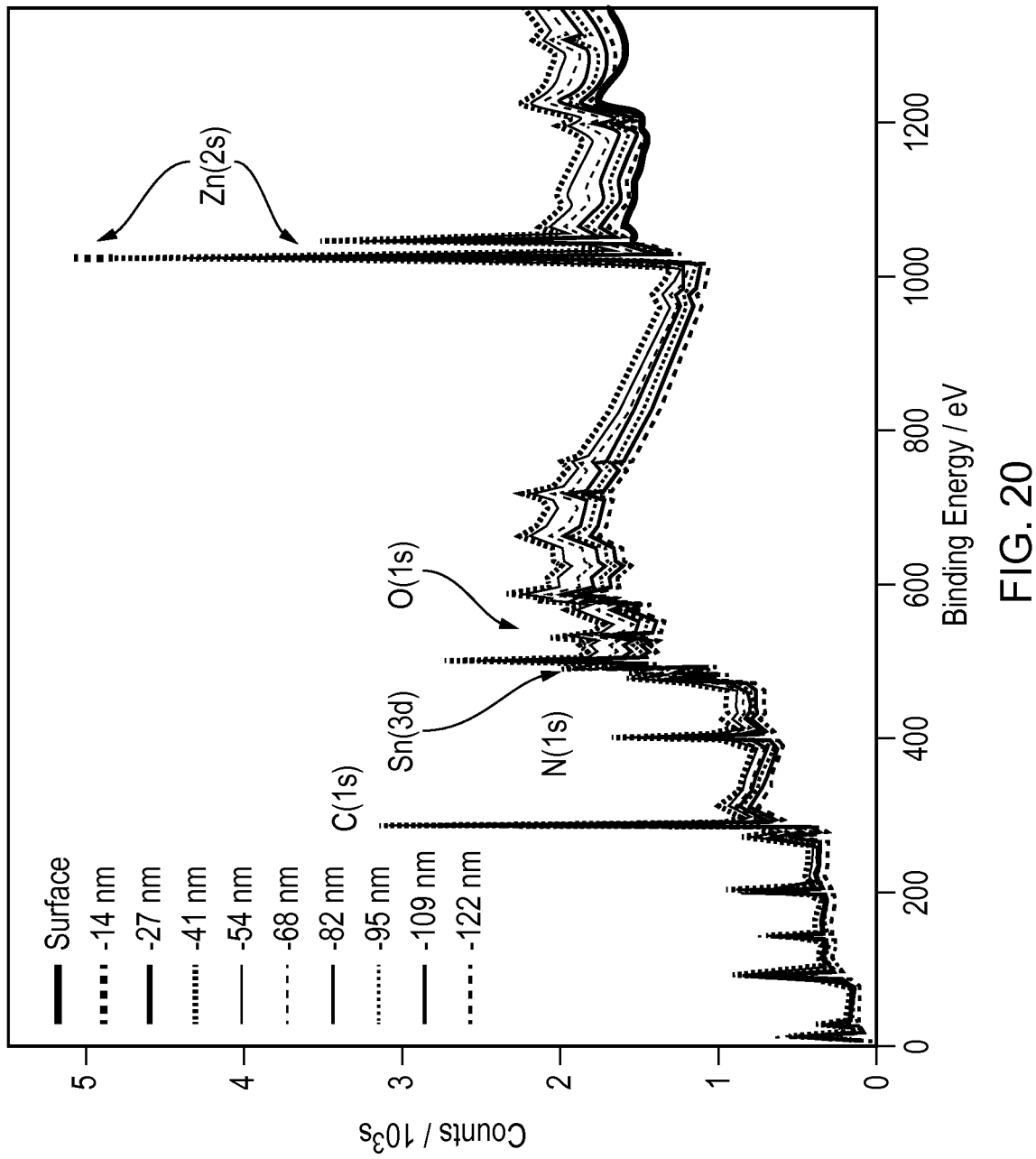

FIG. 20 shows FIB-XPS survey spectra for etched layers of SnO$_2$@$_{mono}$ZIF-8 (etching depth indicated on left in graph).

Figure 21:
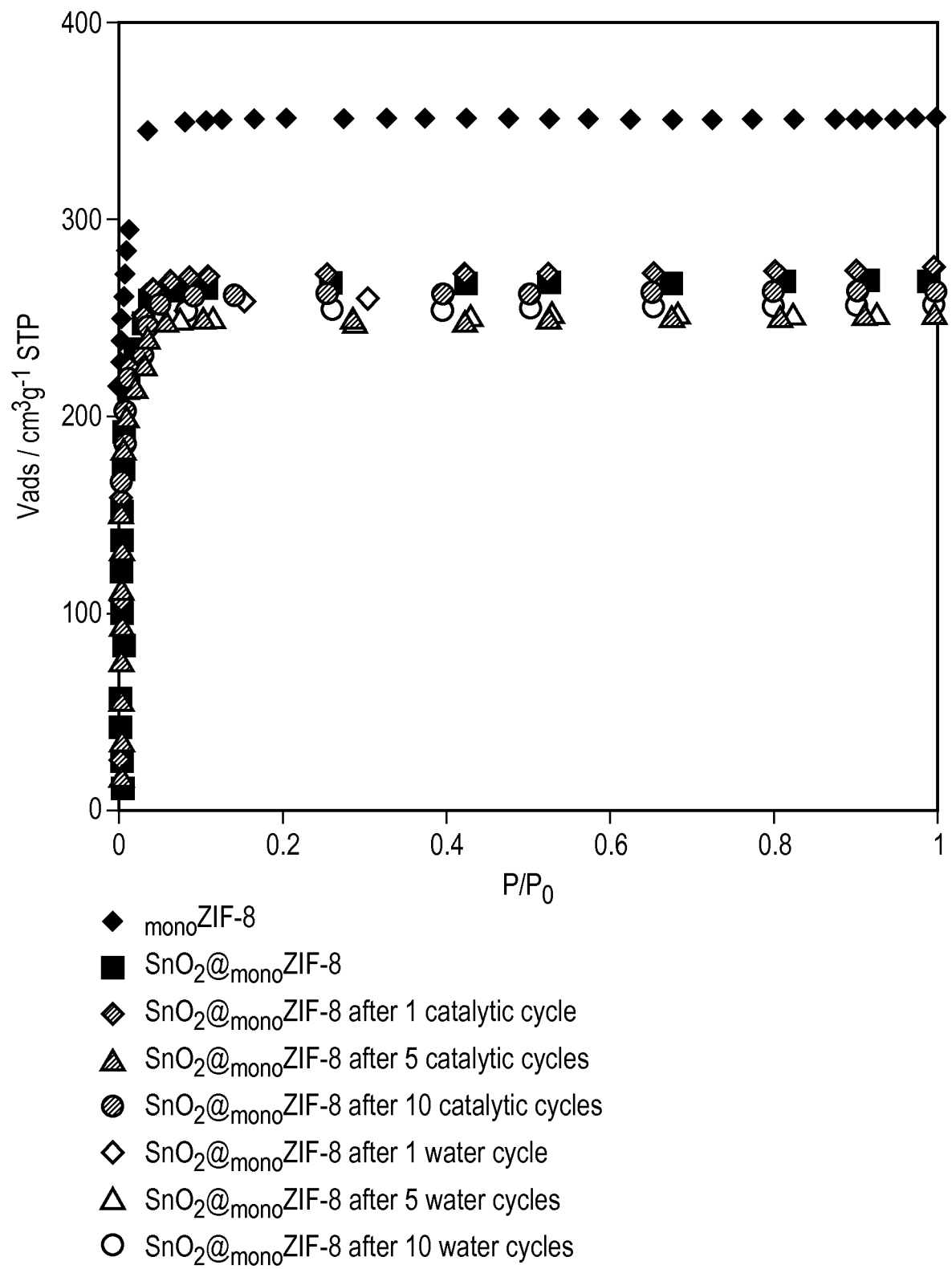

FIG. 21 shows N$_2$ adsorption isotherms at 77 K on non-logarithmic axes for:

$_{mono}$ZIF-8 (large filled diamonds)

SnO$_2$@$_{mono}$ZIF-8 (filled squares)

SnO$_2$@$_{mono}$ZIF-8 after 1 catalytic cycle (small filled diamonds)

SnO$_2$@$_{mono}$ZIF-8 after 5 catalytic cycles (filled triangles)

SnO$_2$@$_{mono}$ZIF-8 after 10 catalytic cycles (filled circles)

SnO$_2$@$_{mono}$ZIF-8 after 1 water cycle (open diamonds)

SnO$_2$@$_{mono}$ZIF-8 after 5 water cycles (open triangles)

SnO$_2$@$_{mono}$ZIF-8 after 10 water cycles (open circles)

Figure 22:
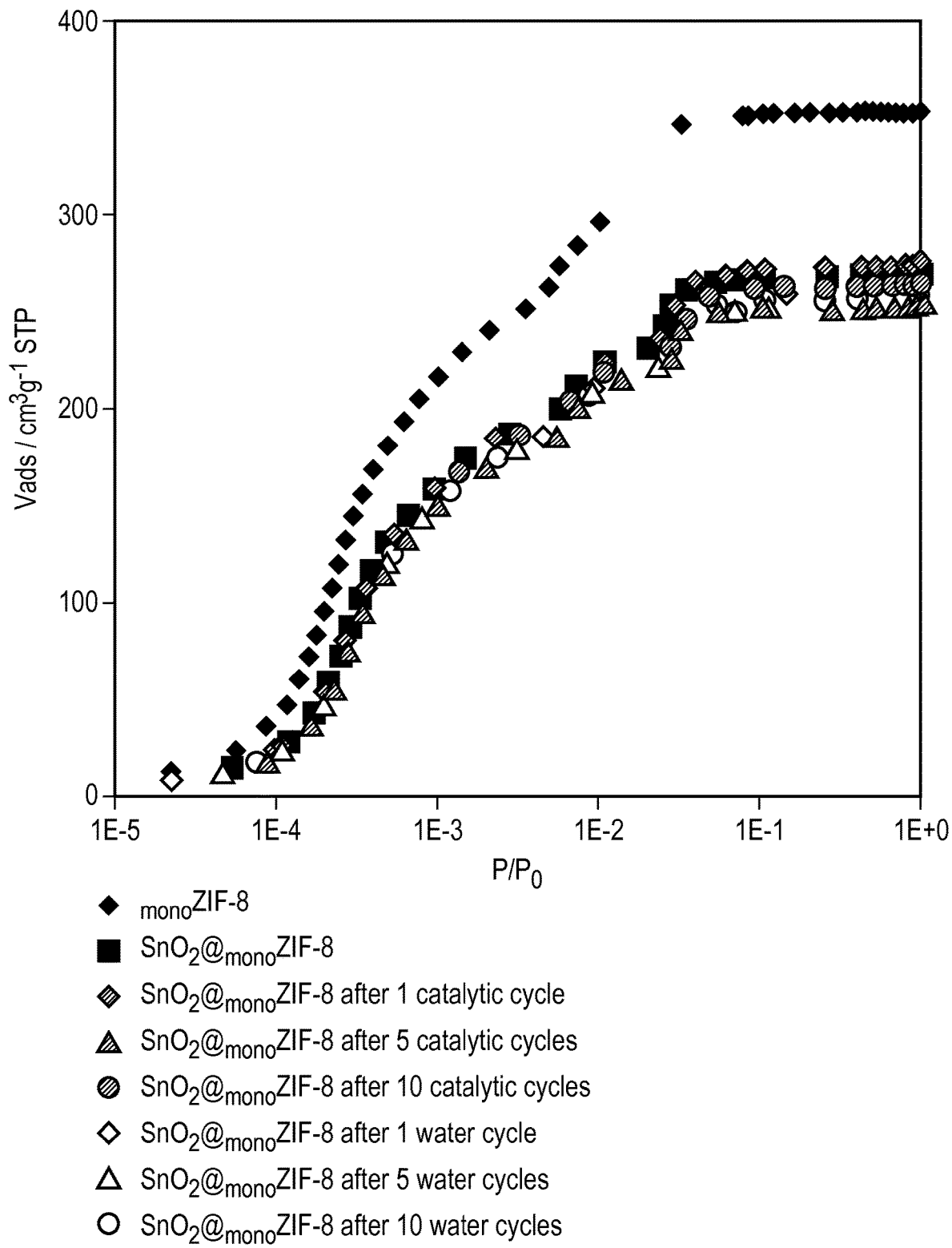

FIG. 22 shows the data of FIG. 21 on semi-logarithmic axes.

Figure 23:
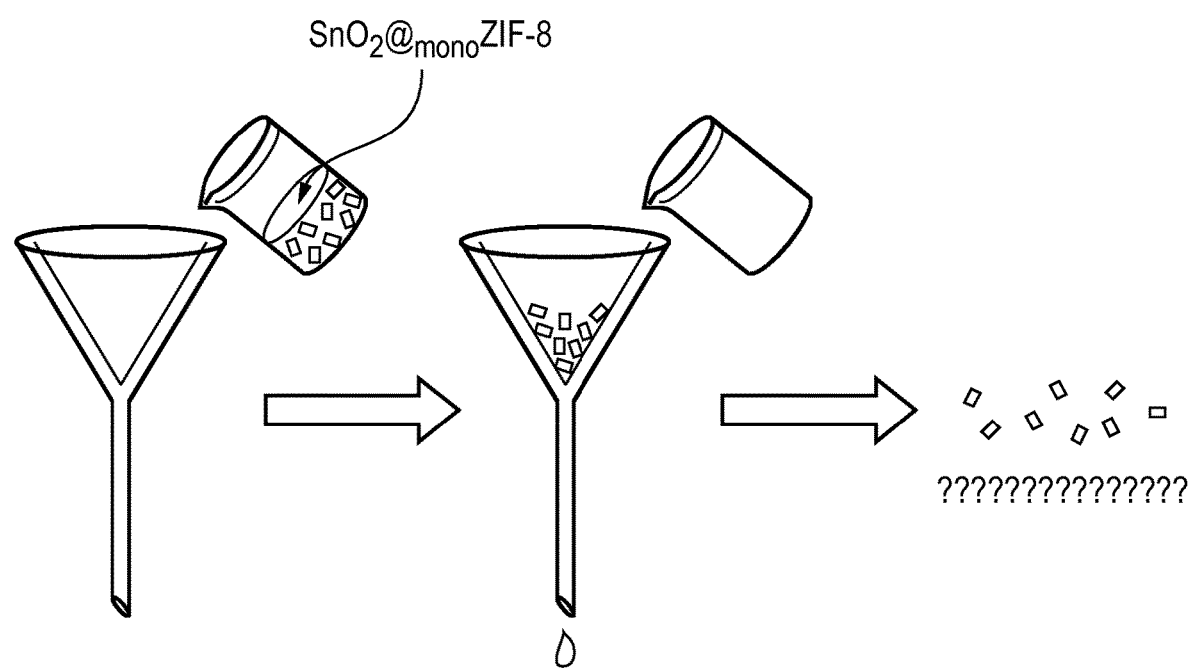

FIG. 23 shows a schematic representation of sample recovery by gravimetric filtration.

Figure 24:
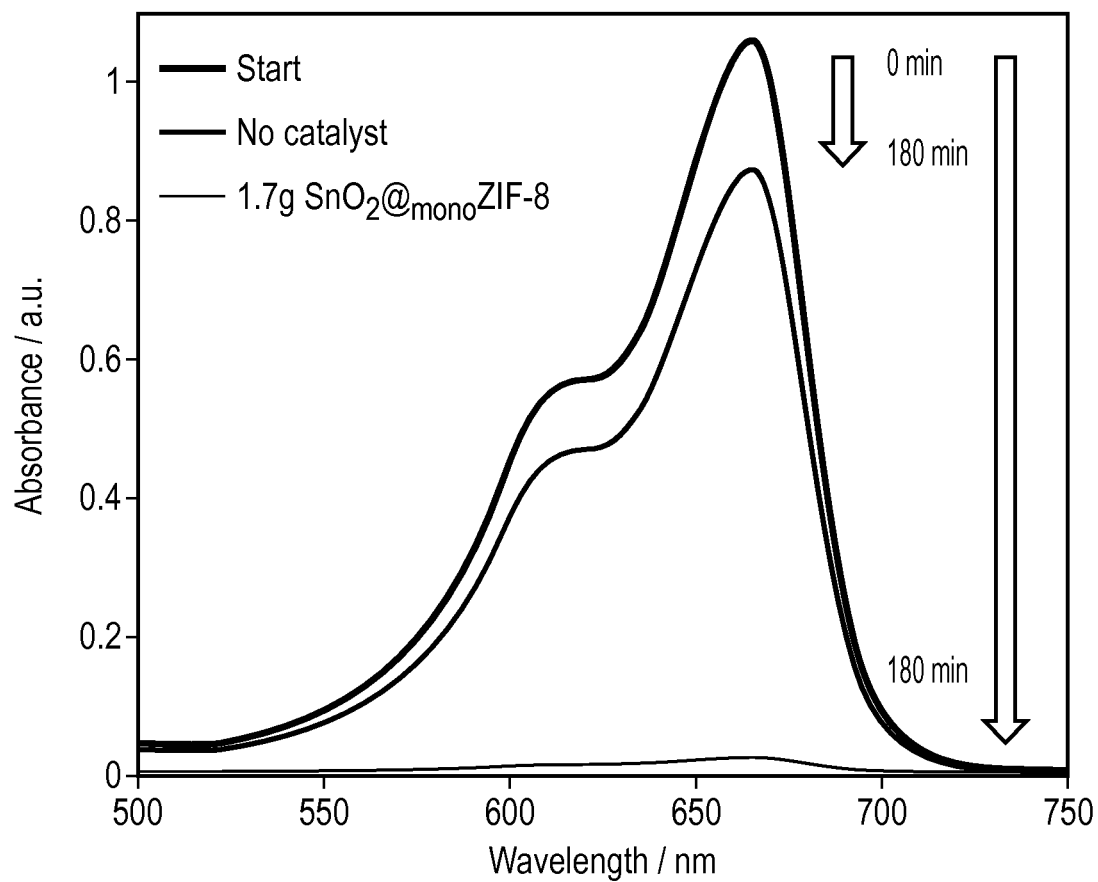

FIG. 24 shows photocatalytically induced spectral changes to aqueous MB dye (1.55×10$^{-5}$M) highlighting degradation of the absorption maximum at 664 nm in the absence of composite (red) and presence of 1.7 g SnO$_2$@$_{mono}$ZIF-8 (green) after 3 hours of simulated solar irradiation.

Figure 25:
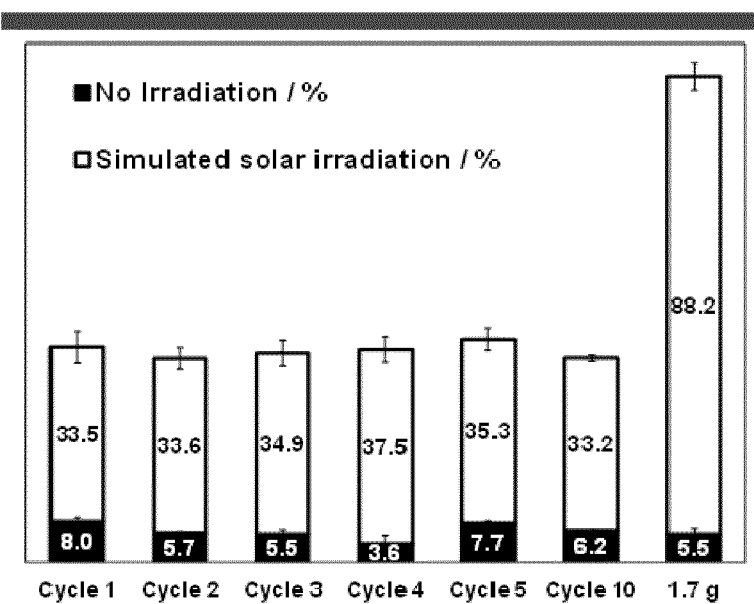

FIG. 25 shows the degradation of MB in the presence of 0.4 g (Cycles 1-5 and 10) and 1.7 g of SnO$_2$@$_{mono}$ZIF-8. Error bars were calculated using the standard deviation in triplicated readings.

FIGS. 26 and 27 show optical microscopy images of the 3-faced pyramidal indents resulting from 2000 nm depth nanoindentation experiments. FIG. 26 shows $_{mono}$ZIF-8 monolith. FIG. 27 shows SnO$_2$@$_{mono}$ZIF-8 composite. The scale bar is 10 μm in each image.

Figure 28:
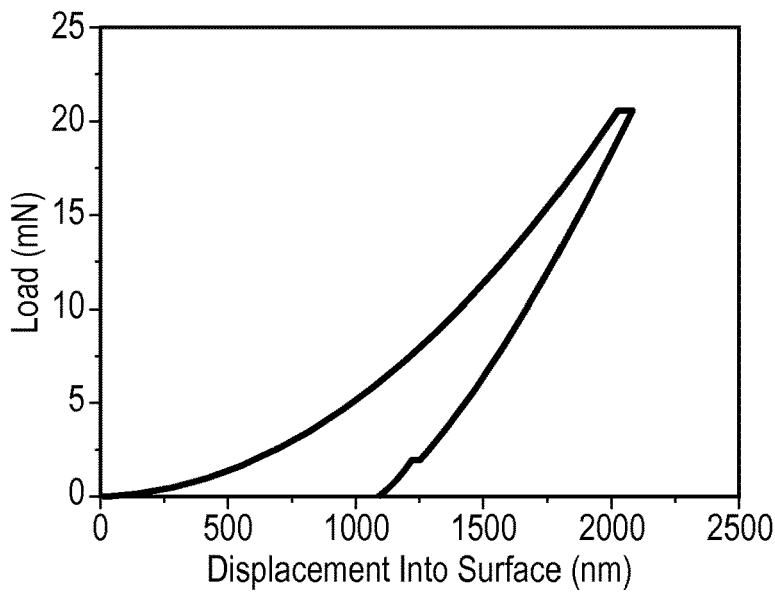
Figure 29:
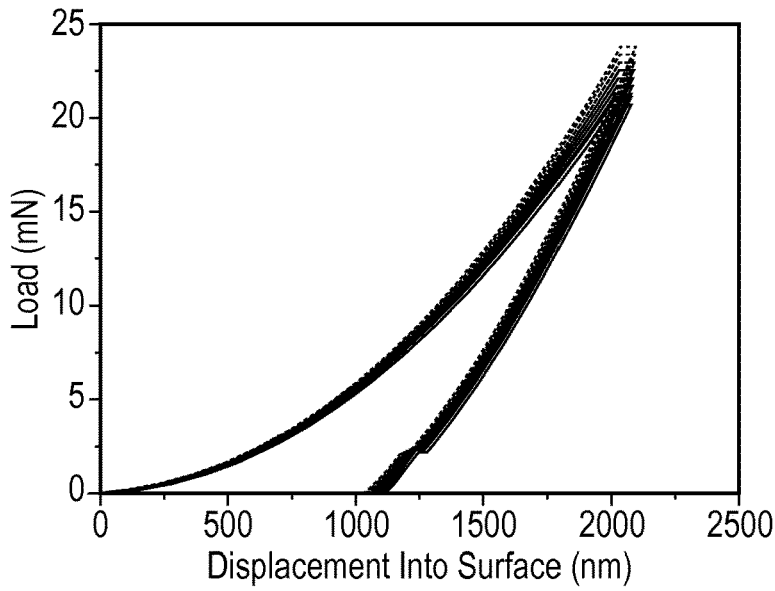
Figure 30:
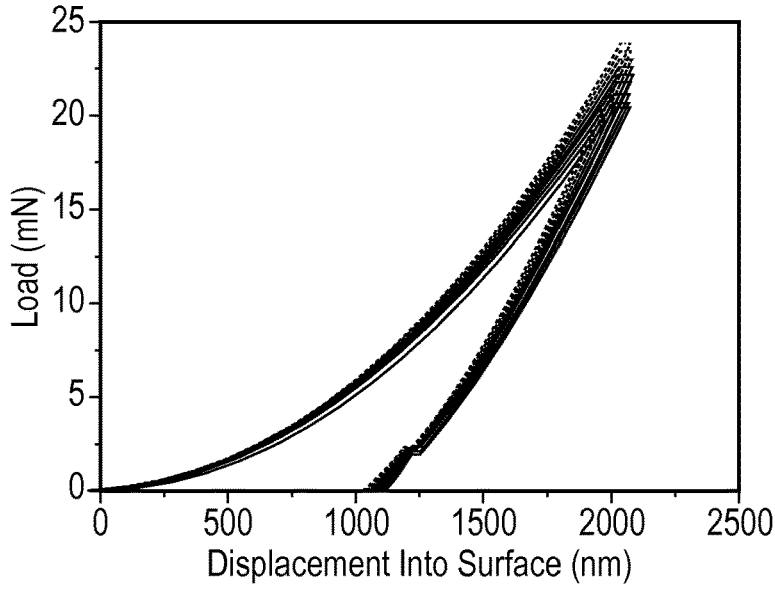

FIGS. 28, 29 and 30 show load-displacement (P-h) nanoindentation data for a surface penetration depth of 2000 nm. In FIG. 28, the results for ZIF-8 monolith are shown on which 9 indentation tests were performed, where highly reproducible P-h data reflect the homogeneous nature of the sample tested. In FIG. 29, the results for SnO$_2$@$_{mono}$ZIF-8 composite are shown, here showing a larger scatter in P-h data, therefore 48 indents were performed to better establish the sample variability. FIG. 30 shows combined P-h nanoindentation curves in which the red curve depicts the consistent data for $_{mono}$ZIF-8, adjacent to the relatively more varied mechanical response of the SnO$_2$@$_{mono}$ZIF-8 composite (blue).

Figure 32:
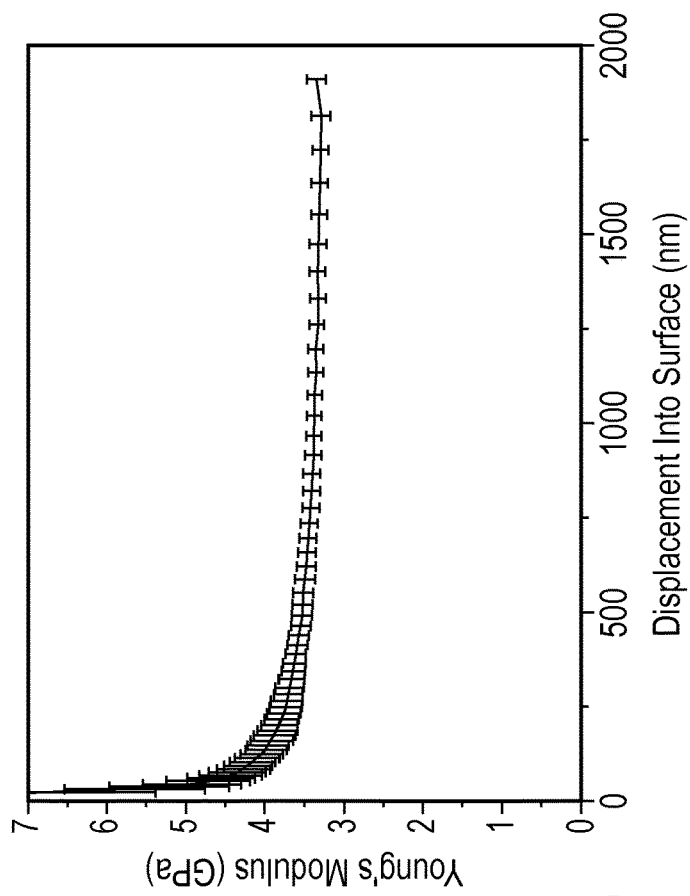
Figure 31:
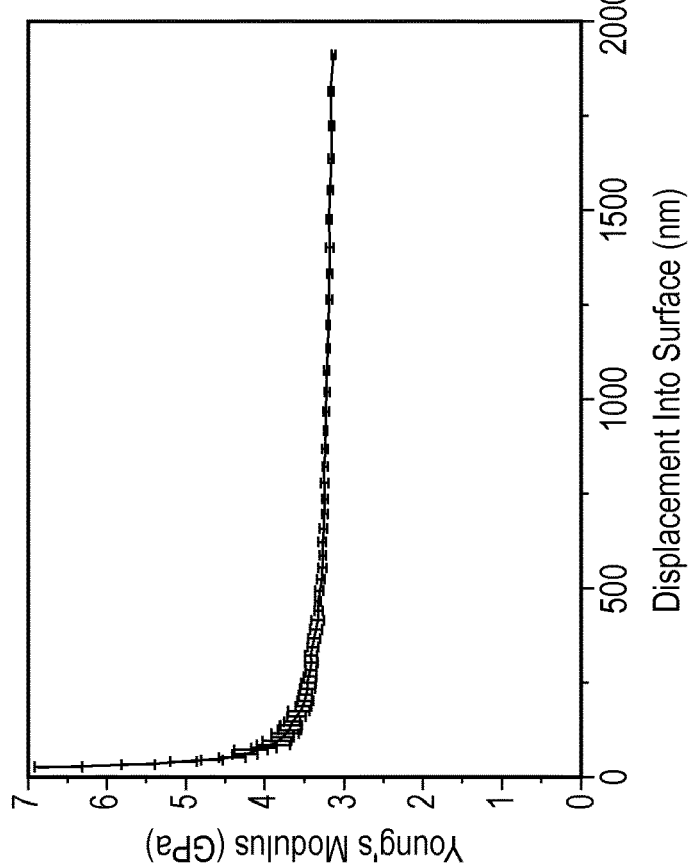

FIGS. 31 and 32 show Young's modulus, E, of $_{mono}$ZIF-8 (FIG. 31) and SnO$_2$@$_{mono}$ZIF-8 (FIG. 32) plotted as a function of surface penetration depth, where each red error bar corresponds to the standard deviation in 9 and 48 indents, respectively. Averaged Young's moduli of $_{mono}$-ZIF-8 and the composite were determined using data collected over the 500-2000 nm indent range, yielding 3.0±0.1 GPa and 3.3±0.1 GPa, respectively.

Figures 33, 34:
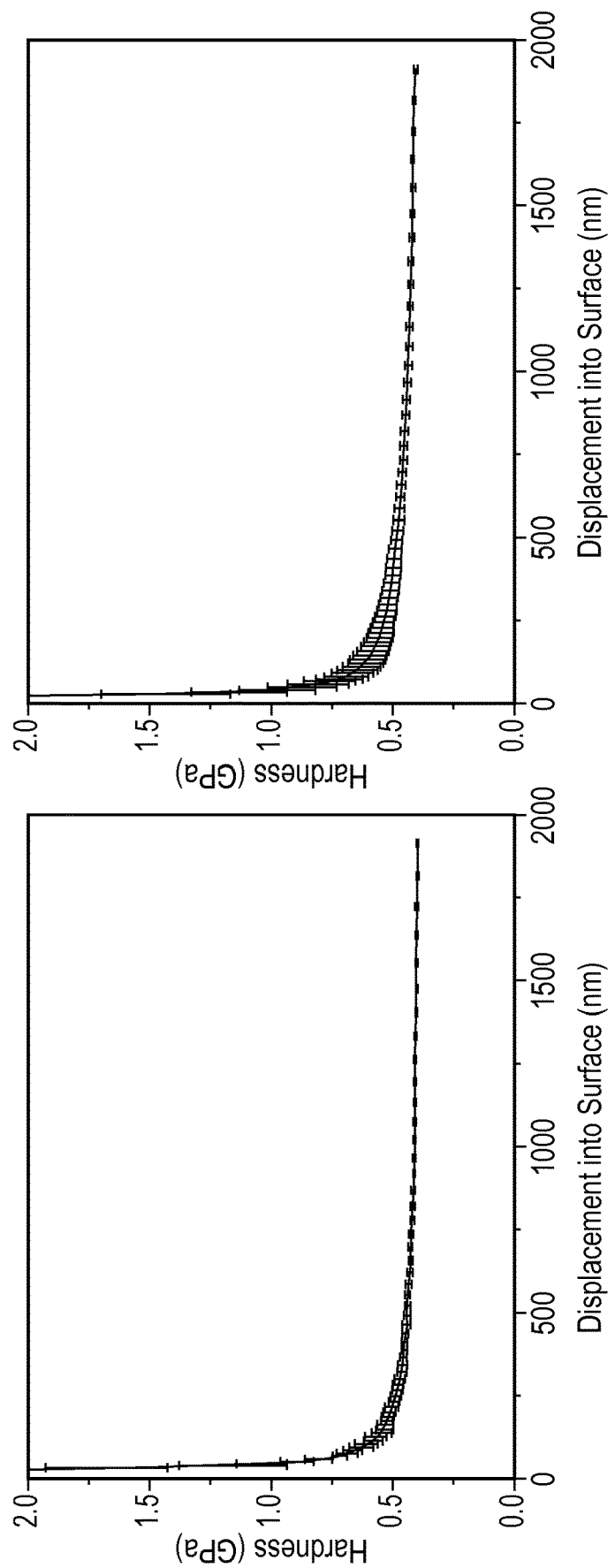

FIGS. 33 and 34 show hardness of $_{mono}$ZIF-8 (FIG. 31) and SnO$_2$@$_{mono}$ZIF-8 (FIG. 32) plotted as a function of surface penetration depth. Each red error bar arises from the standard deviation in 9 and 48 indents, respectively. Averaged hardnesses of $_{mono}$ZIF-8 and the composite were determined using data collected over the 500-2000 nm indent range, yielding 0.41±0.01 GPa and 0.44±0.01 GPa, respectively.

Figure 35:
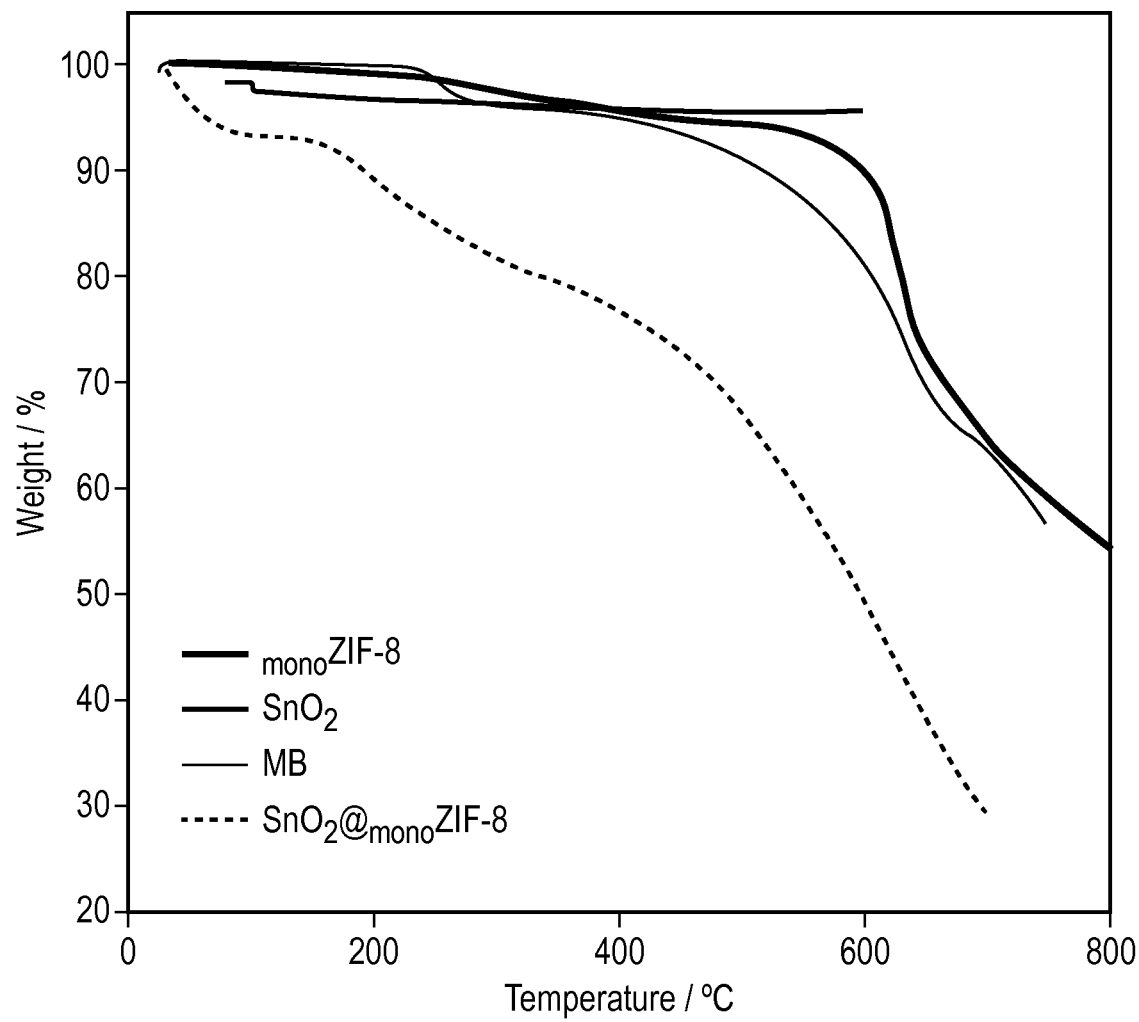

FIG. 35 shows thermogravimetric analysis of $_{mono}$ZIF-8, SnO$_2$—NPs, methylene blue (MB), and SnO$_2$@$_{mono}$ZIF-8.

Figure 37:
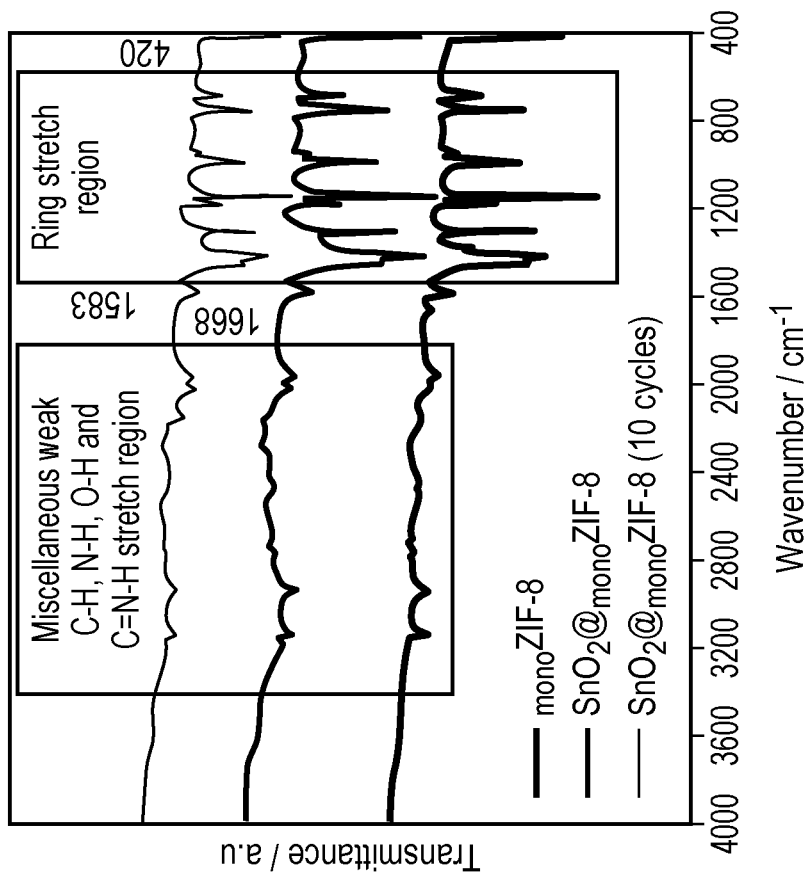
Figure 36:
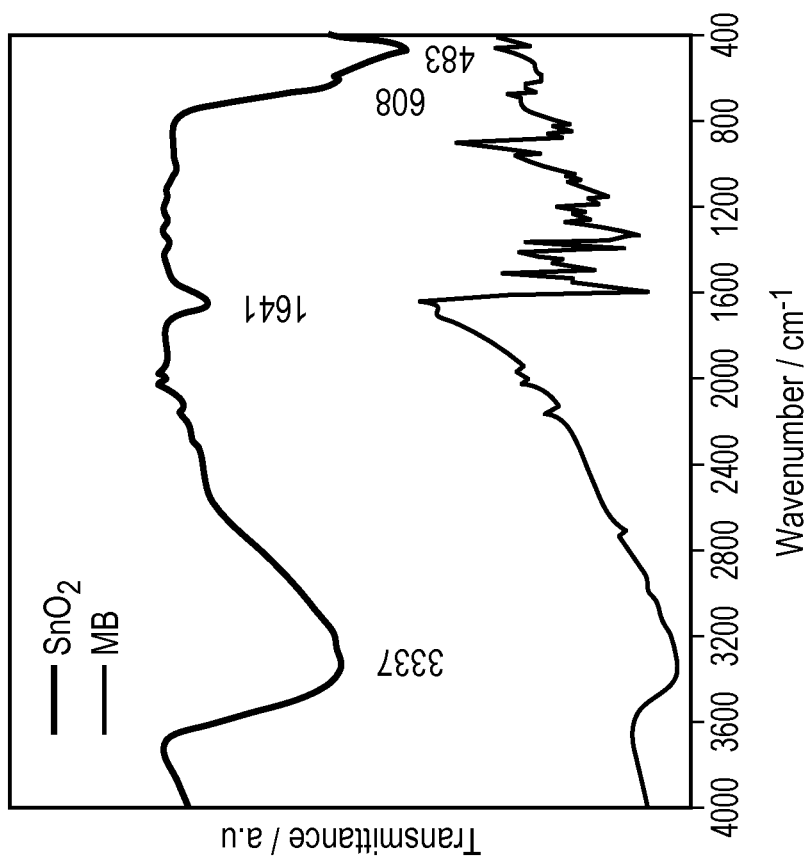

FIGS. 36 and 37 show FT-IR spectra of SnO$_2$ nanoparticles and MB (FIG. 36) and $_{mono}$ZIF-8, fresh SnO$_2$@$_{mono}$ZIF-8 and SnO$_2$@$_{mono}$ZIF-8 after 10 catalytic cycles of MB dye degradation (FIG. 37).

Figure 38:
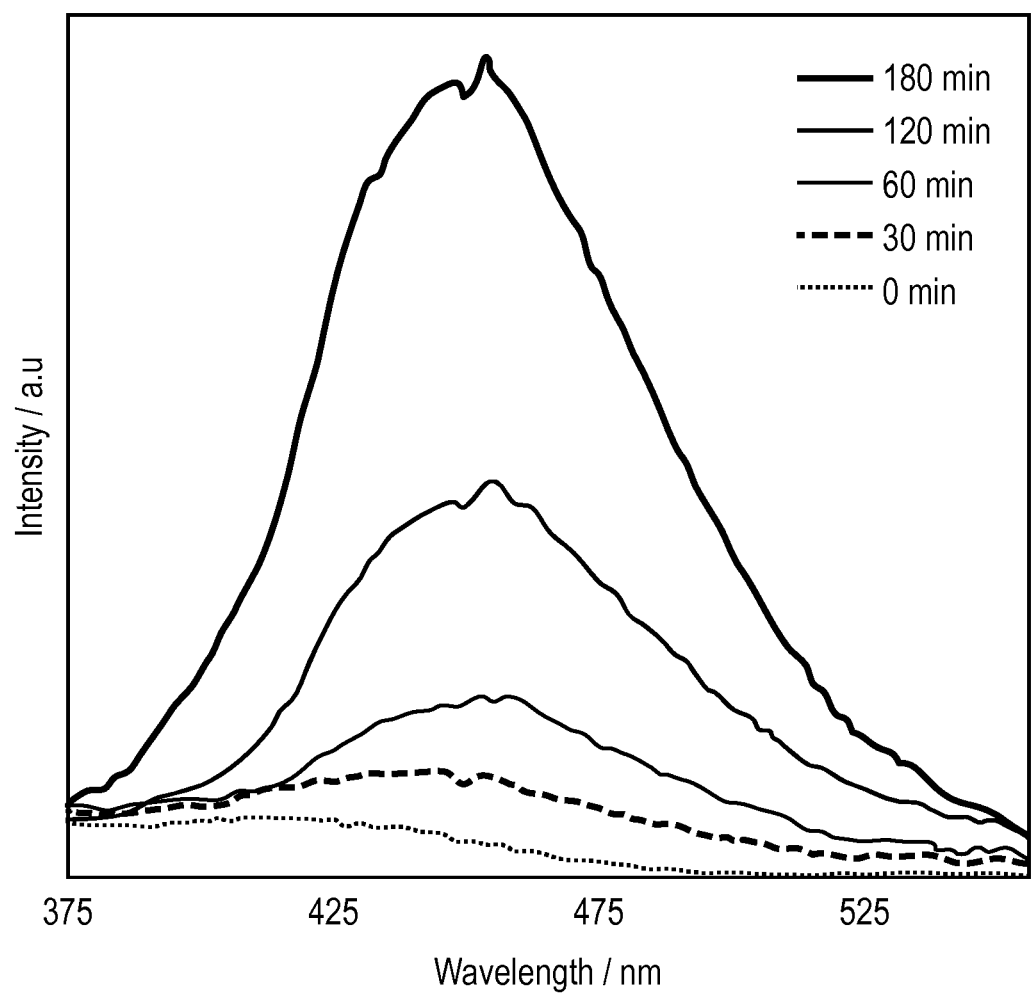

FIG. 38 shows fluorescence spectral changes measured under simulated solar illumination of 0.4 g of SnO$_2$@$_{mono}$ZIF-8 in a basic solution of TA (excitation at 315 nm).

Figure 39:
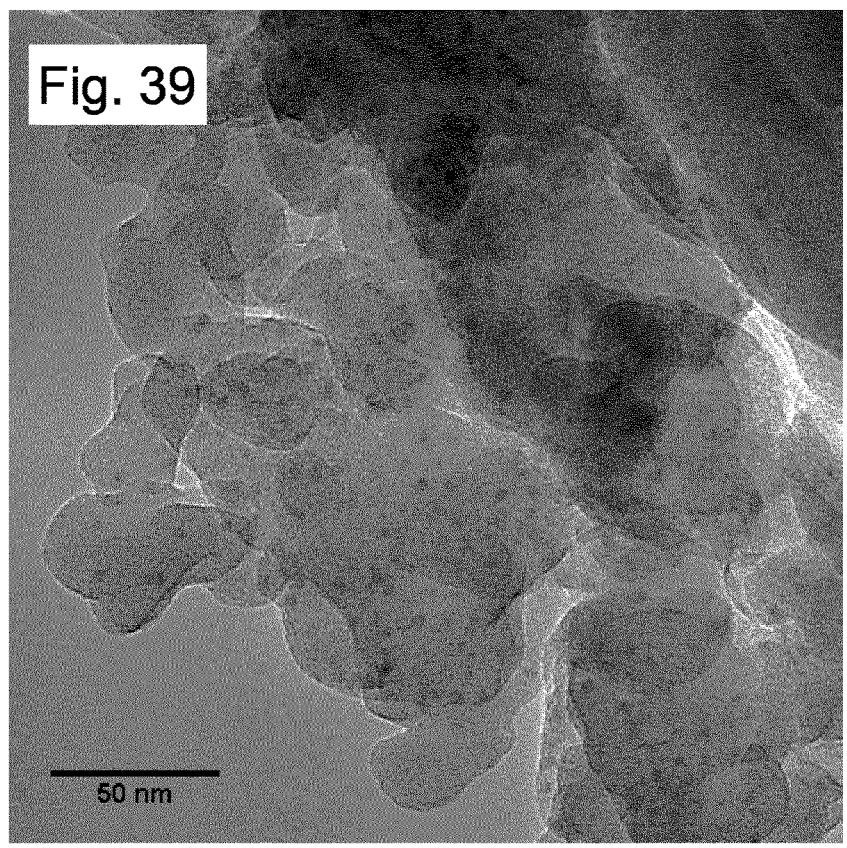
Figure 40:
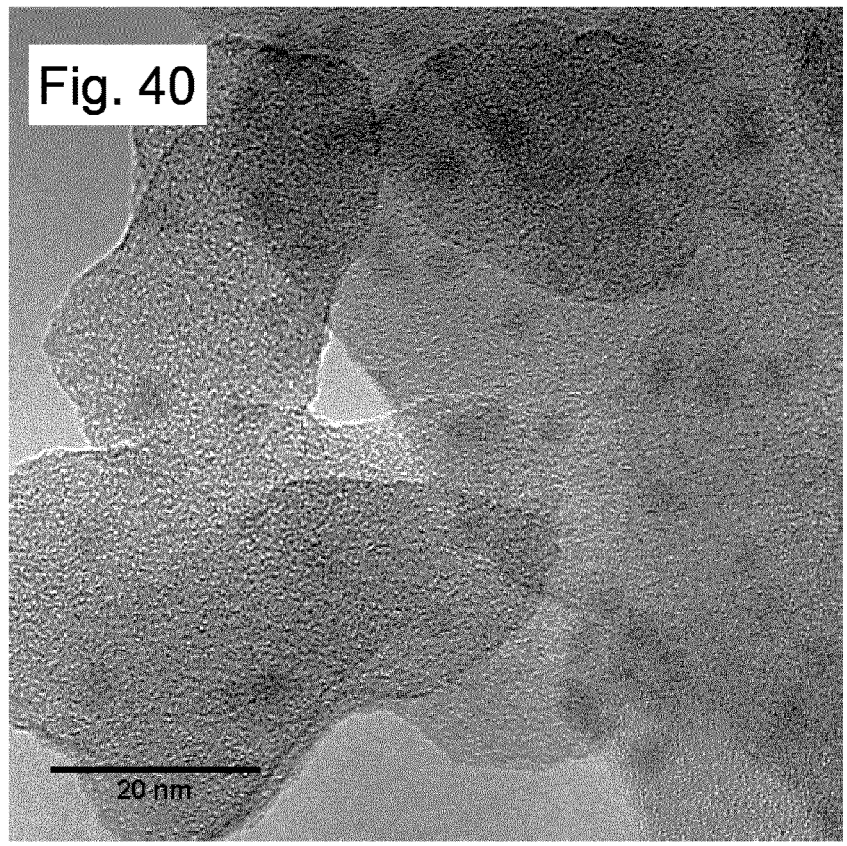

FIGS. 39 and 40 show TEM images for CdSe@ZIF-8$_{mono}$.

Figure 41:
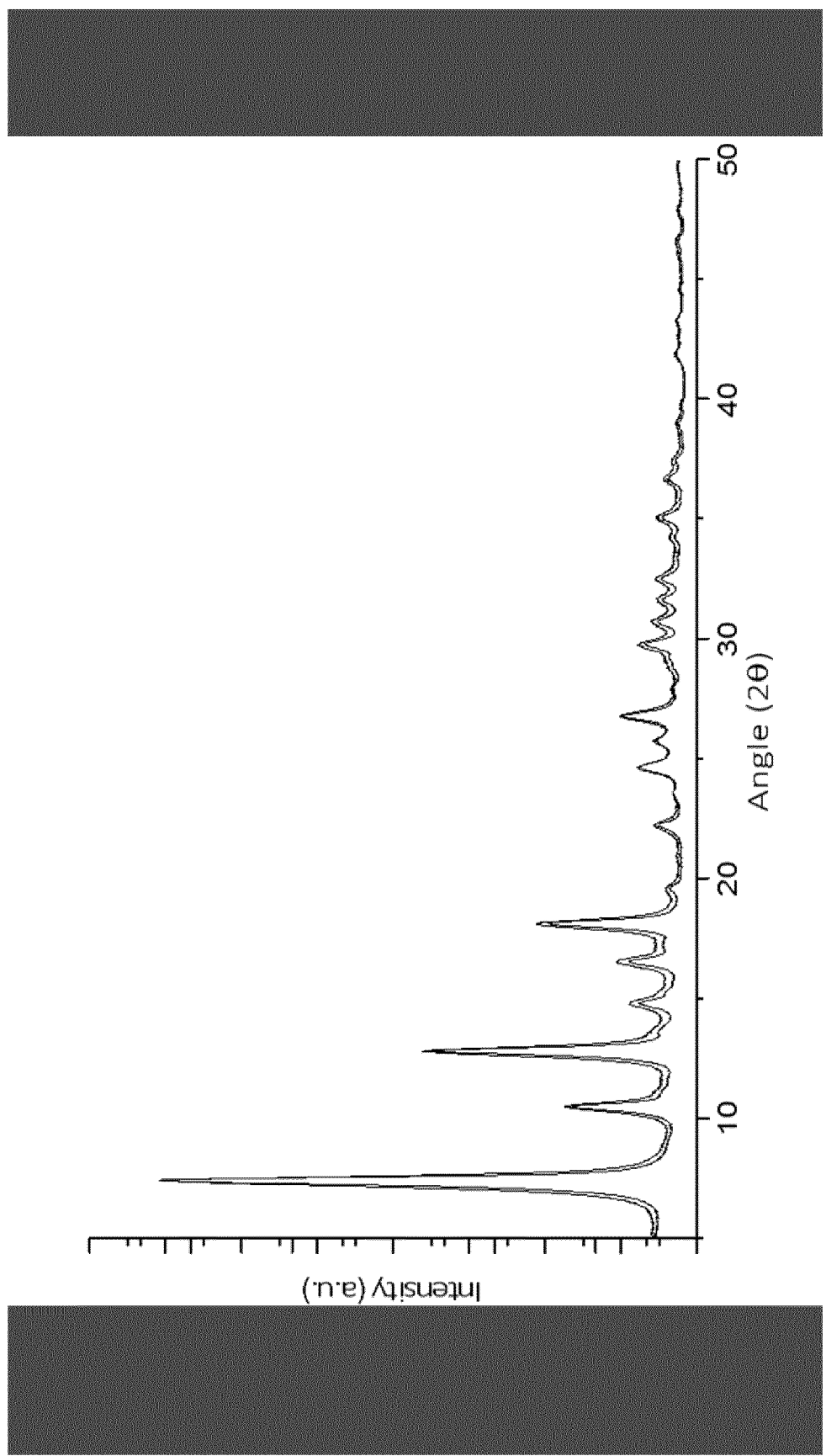

FIG. 41 shows powder XRD (PXRD) patterns for CdSe@ZIF-8$_{mono}$ (upper line) and for ZIF-8$_{mono}$ (lower line).

Figure 43:
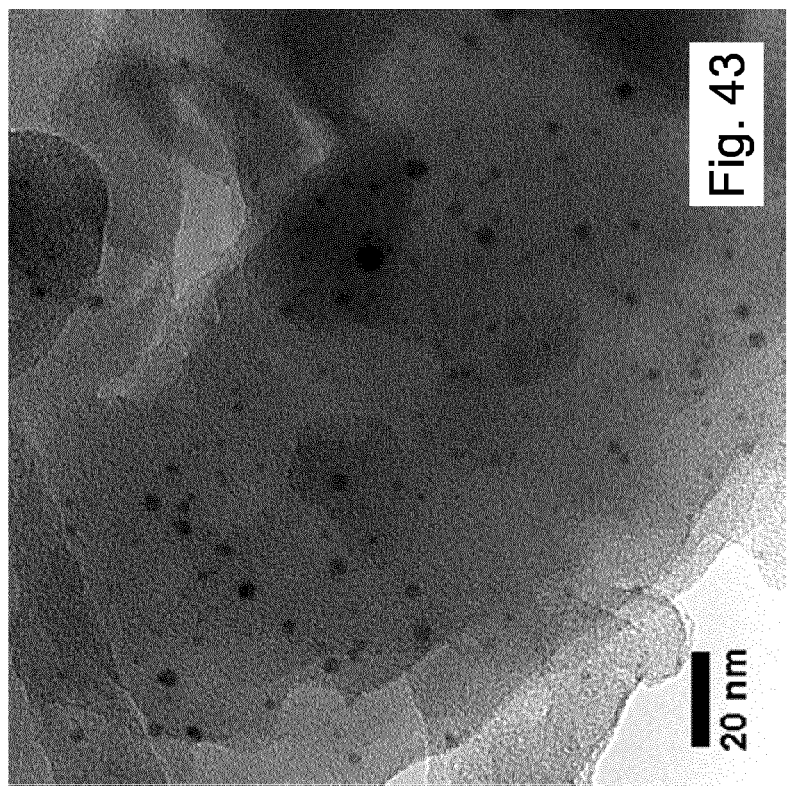
Figure 42:
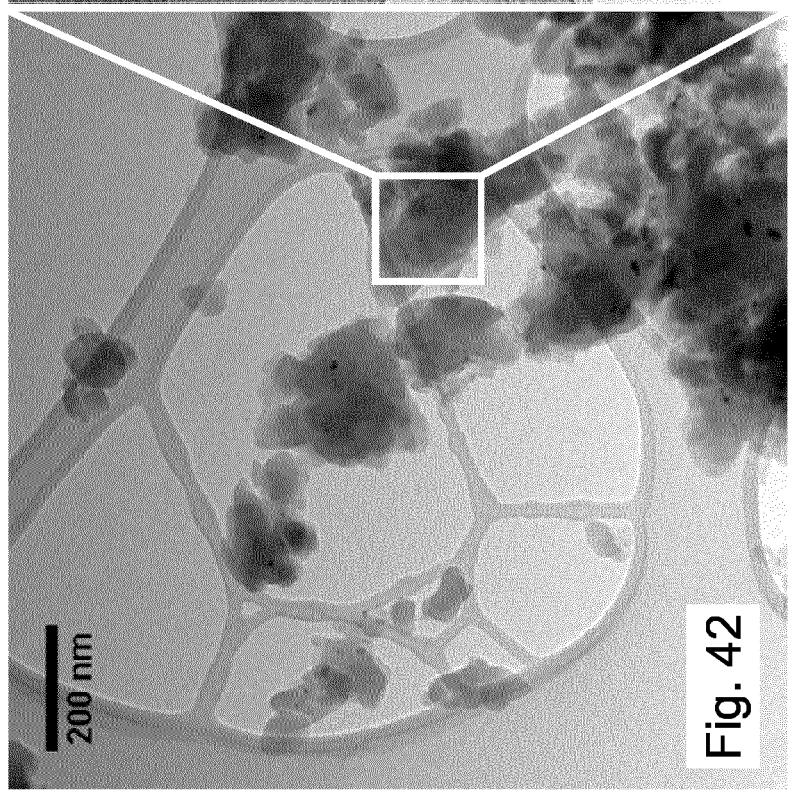

FIGS. 42 and 43 show TEM images for Au@ZIF-8$_{mono}$. The magnified image shown in FIG. 43 is of the area indicated in FIG. 42.

Figure 44:
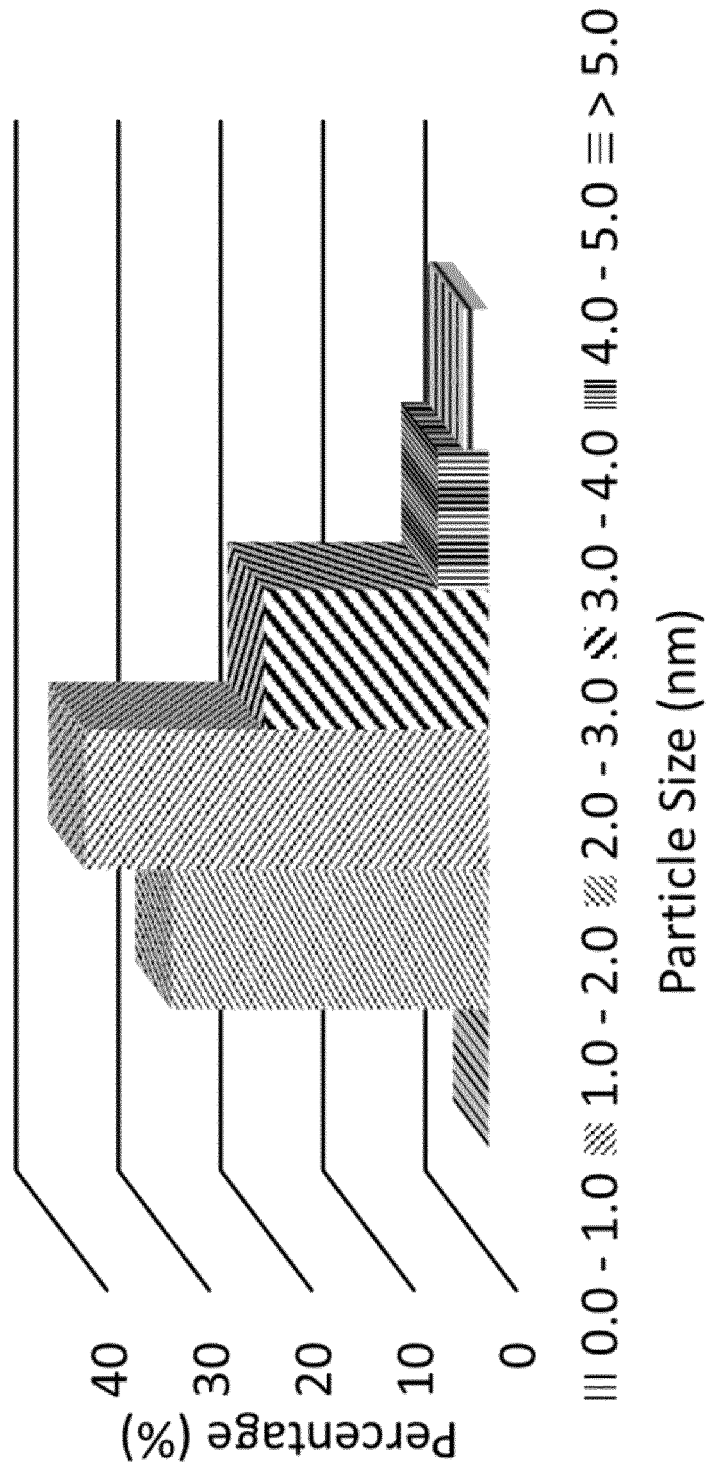

FIG. 44 shows the particle size distribution of Au nanoparticles in Au@ZIF-8$_{mono}$. The measured average particle size of Au nanoparticles was 2.60±0.96 nm (assessed over 200 particles). The largest Au particles (very rarely seen) were never more than about 7 nm in diameter.

Figure 45:
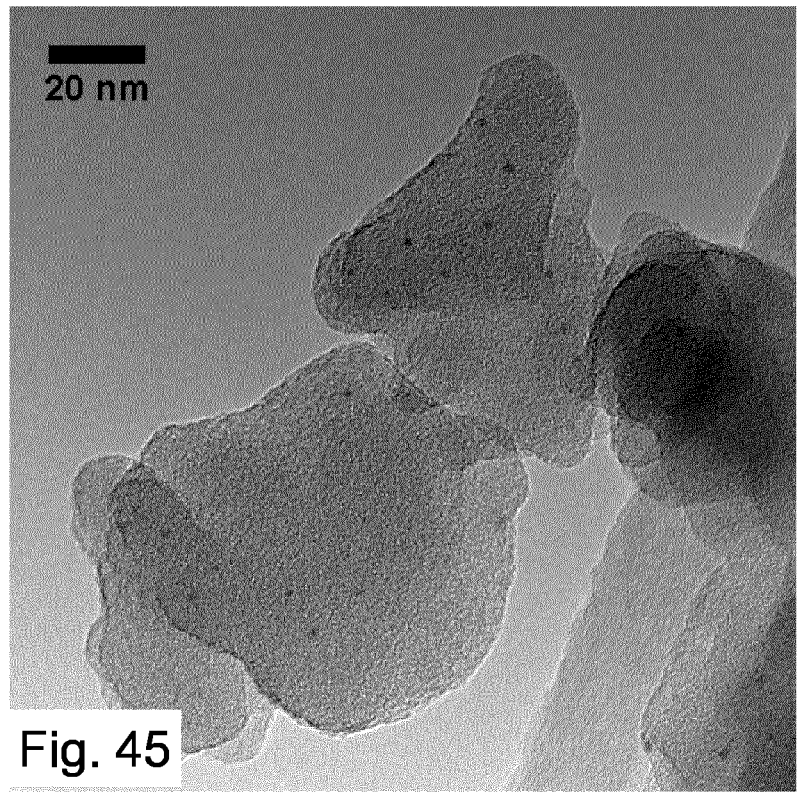
Figure 46:
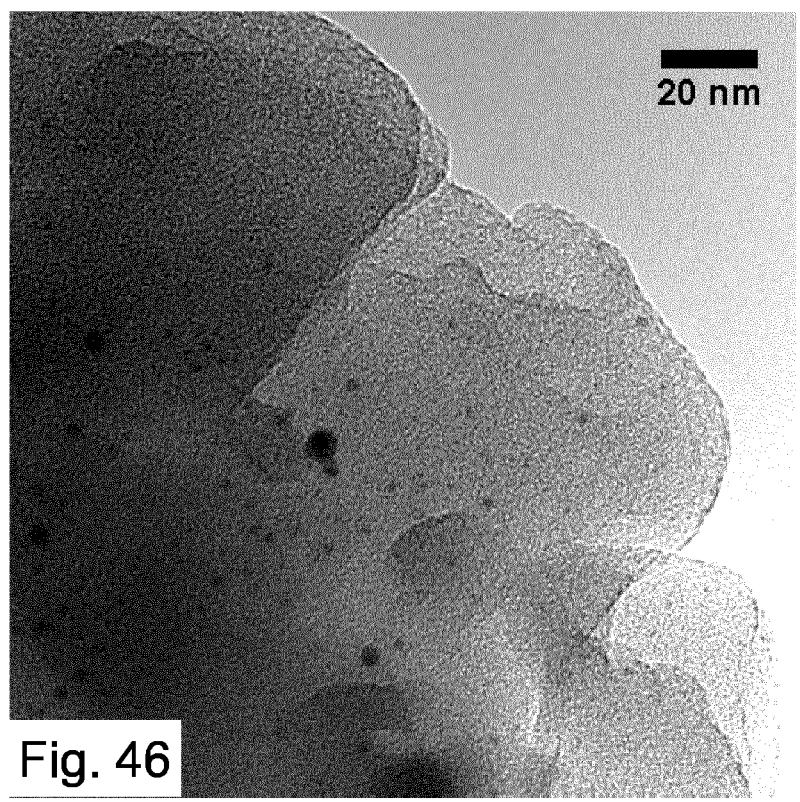

FIGS. 45 and 46 show further TEM images for Au@ZIF-8$_{mono}$.

Figure 47:
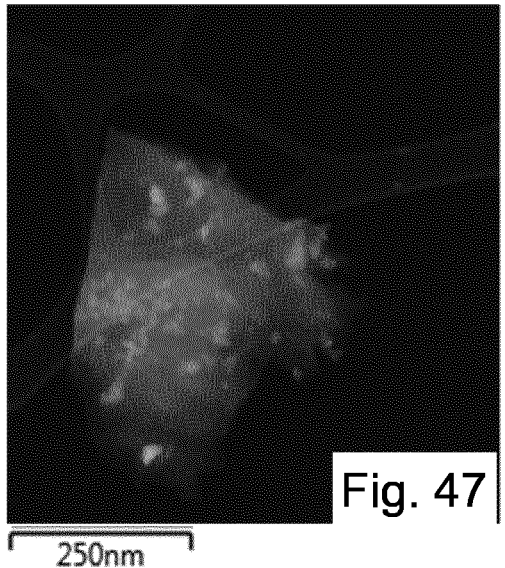
Figure 48:
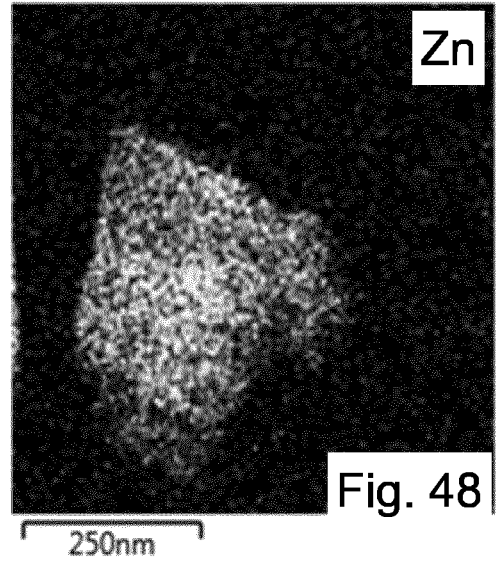
Figure 49:
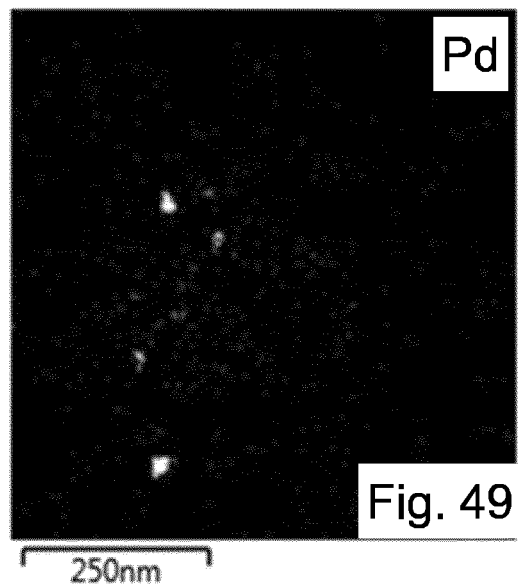
Figure 50:
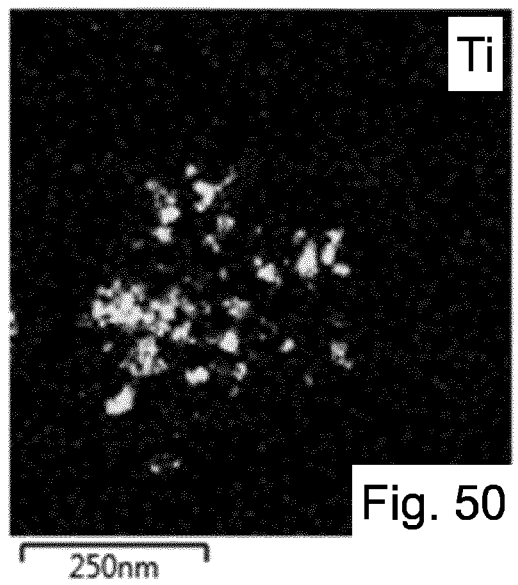

FIG. 47 shows a scanning transmission electron microscope—high-angle annular dark field (STEM-HAADF) image of (PdO/TiO$_2$)@ZIF-8$_{mono}$. FIGS. 48, 49 and 50 show elemental maps, for the particle imaged in FIG. 47, of Zn, Pd and Ti, respectively.

Figure 51:
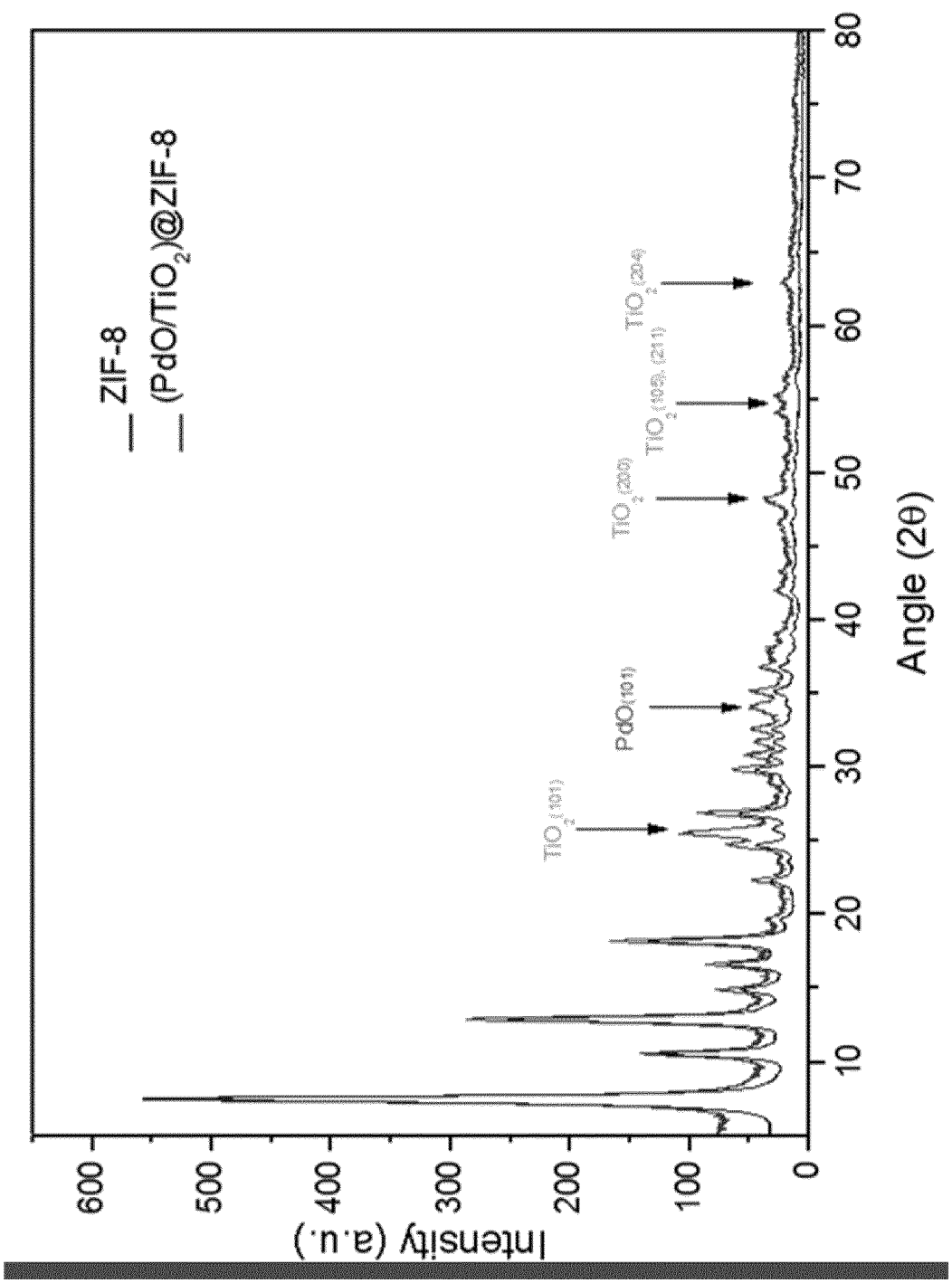

FIG. 51 shows powder XRD (PXRD) patterns for (PdO/TiO$_2$)@ZIF-8$_{mono}$ (upper line) and for ZIF-8$_{mono}$ (lower line). Specific peaks of interest in the (PdO/TiO$_2$)@ZIF-8$_{mono}$ pattern are labelled.

FIGS. 52, 53, 54 and 55 show elemental maps for Zn, Ti, Au and Pd, respectively for a ((Au@PdO)/TiO$_2$)@ZIF-8$_{mono}$ particle imaged via transmission electron microscope-high-angle annular dark field (STEM-HAADF).

Figure 56:
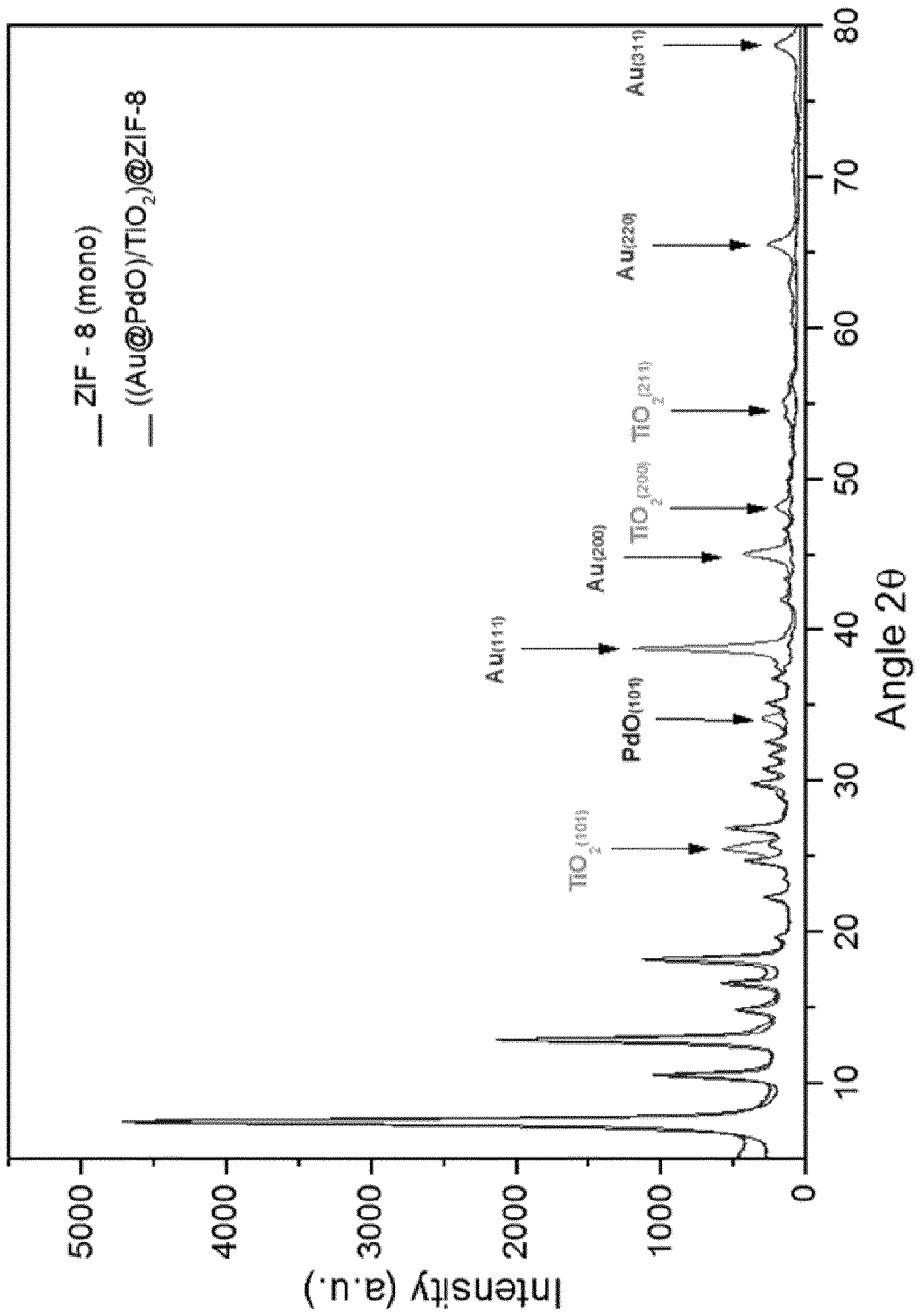

FIG. 56 shows powder XRD (PXRD) patterns for ((Au@PdO)/TiO$_2$)@ZIF-8$_{mono}$ (upper line) and for ZIF-8$_{mono}$ (lower line). Specific peaks of interest in the ((Au@PdO)/TiO$_2$)@ZIF-8$_{mono}$ pattern are labelled.

Figure 57:
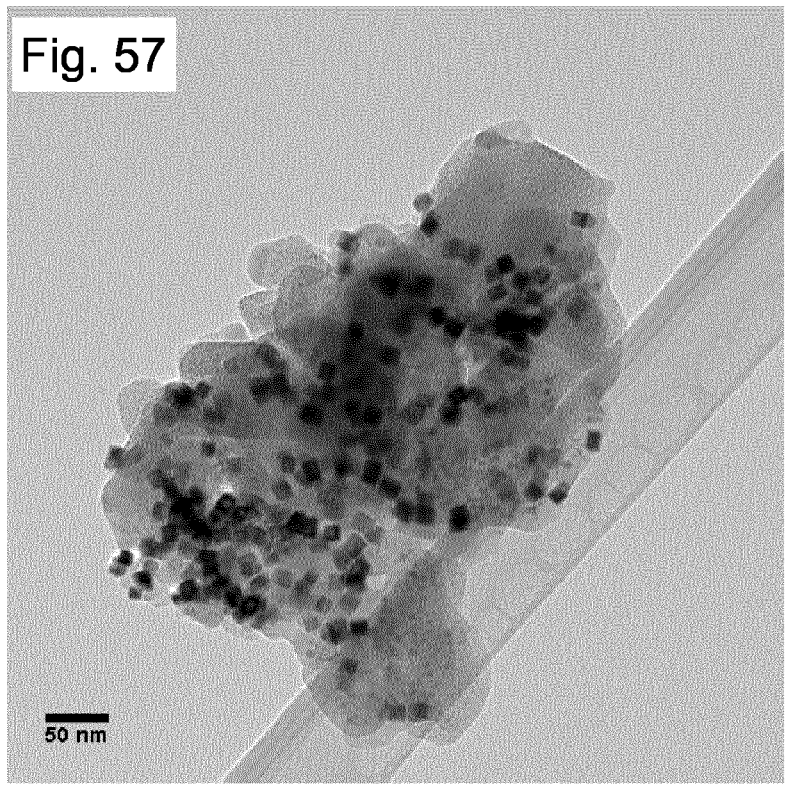

FIG. 57 shows a TEM image for Pd@HKUST-1$_{mono}$.

Figure 58:
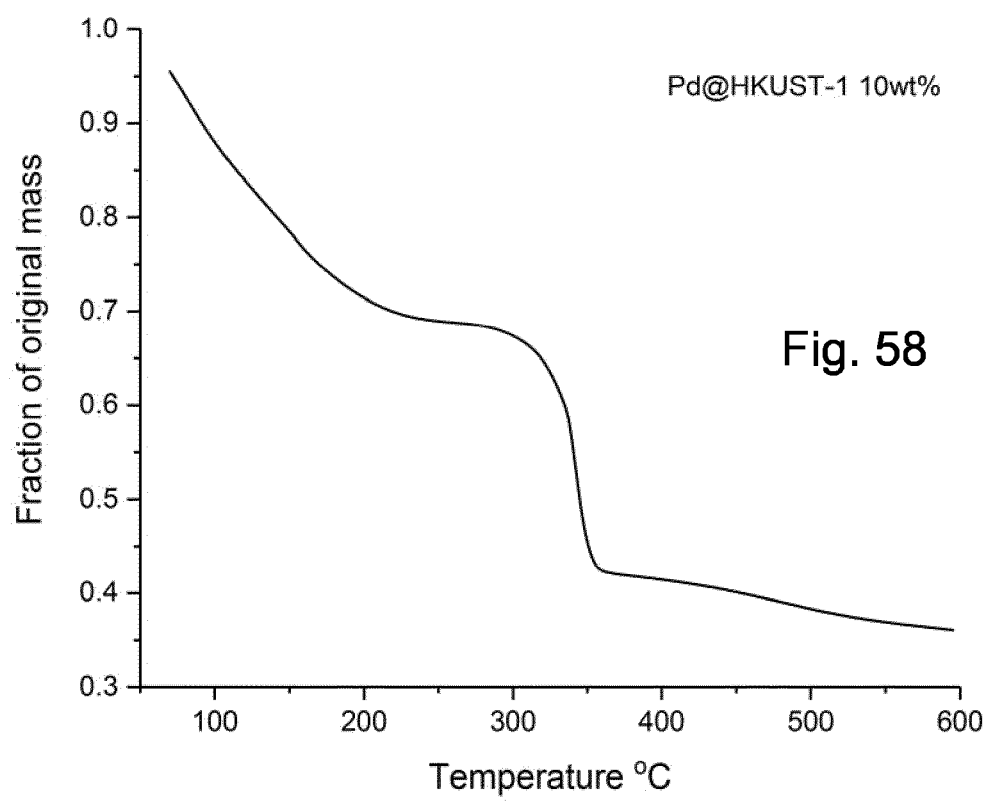

FIG. 58 shows the response of Pd@HKUST-1$_{mono}$ to thermogravimetric analysis (TGA).

DETAILED DESCRIPTION OF THE PREFERRED EMBODIMENTS, AND FURTHER OPTIONAL FEATURES OF THE INVENTION

The photocatalytic degradation of toxic dye effluents has received considerable attention. Despite semiconducting nanoparticles being promising photocatalysts for the degradation of these compounds, their powder morphology has previously hindered applications due to poor catalyst retention and recyclability. Furthermore, applications development faces difficulties owing to particle toxicity and agglomeration. We disclose here, in one embodiment of the invention, a new type of composite material involving the in situ immobilization of tin oxide nanoparticles (SnO$_2$—NPs) within a monolithic metal-organic framework (MOF), the zeolitic imidazolate framework ZIF-8. SnO$_2$@$_{mono}$ZIF-8 exploits the mechanical properties and structural resilience of a monolithic MOF, whilst leveraging the catalytic action of the nanoparticles. The composite displays outstanding photocatalytic properties with full retention of activity observed after 10 catalytic cycles and represents a substantial advance in the field of treating toxic effluents and a vital validation for commercial application.

Zeolitic imidazolate frameworks (ZIFs) are MOFs with zeolitic topologies based on large cages and narrow windows [Ref. 1]. ZIF-8 (Zn(2-mlm)$_2$, 2-mlm=C$_4$H$_5$N$_2$$^-$) in particular, boasts both high porosity (1.16 nm cavity diameter; flexible 0.34 nm window diameter [Ref. 2]; total pore volume 0.485 cm$^3$ g$^{-1}$) and high chemical and thermal stability [Ref. 3]. However, despite their industrial potential, MOFs and ZIFs are almost invariably synthesized in powdered or thin film morphologies [Ref. 4]. In a recent major advance in MOF shaping, we presented a novel sol-gel synthetic method for producing transparent, robust, monolithic ZIF-8 without the need for high pressures or binders [Ref. 5]. These monoliths retained the same porous texture and chemical stability of the powder [Ref. 6] but now in the form of a mechanically robust macrostructure with bulk densities and volumetric BET areas 3-4 times higher than those of the powder. Compared with other pelletization methods that can lead to up to 90% of pore collapse due to the use of high pressures [Ref. 7], this synthetic protocol and monolithic morphology introduces the possibility of creating mechanically stable supports based on porous MOFs that can incorporate highly active and potentially toxic species such as nanoparticles (NPs) [Refs. 8 and 9].

The incorporation of catalytically active NPs, in one embodiment, into a MOF represents a method of exploiting the combined physico-chemical properties of both constituents [Ref. 10]. However, to the best of the inventors' knowledge, there are no reports of nanoparticle encapsulation via a 'bottom up' synthesis involving MOF precursors resulting in a mechanically stable monolithic composite (NP@$_{mono}$MOF) recoverable by simple filtration. Previous attempts to exploit the properties of MOFs for environmental remediation have focused on powdered morphologies, with their ability to degrade toxic organic compounds being poor [Ref. 11]. In this work, we synthesize mechanically and chemically robust monolithic SnO$_2$@$_{mono}$ZIF-8, in one embodiment. This composite combines excellent activity in the degradation of toxic industry effluent with straightforward catalyst recyclability.

Figure 1:
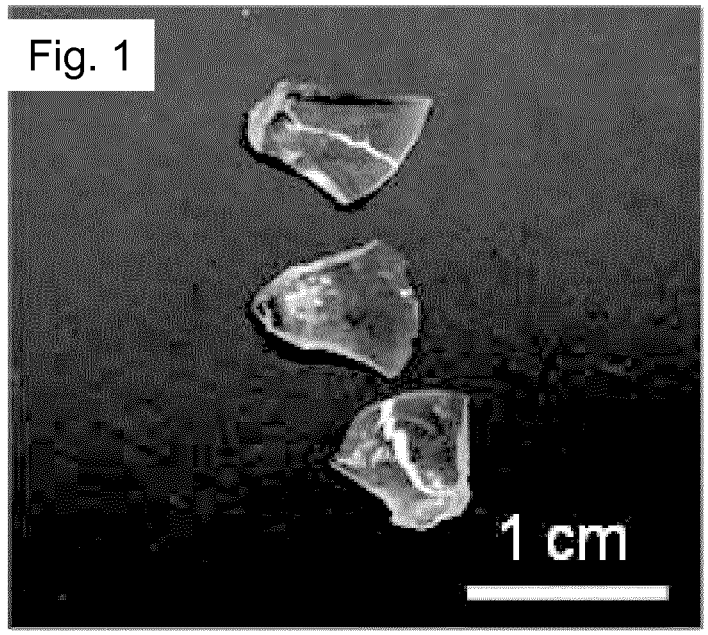
FIG. 1 shows a representative image of $_{mono}$ZIF-8, for reference.
Figure 2:
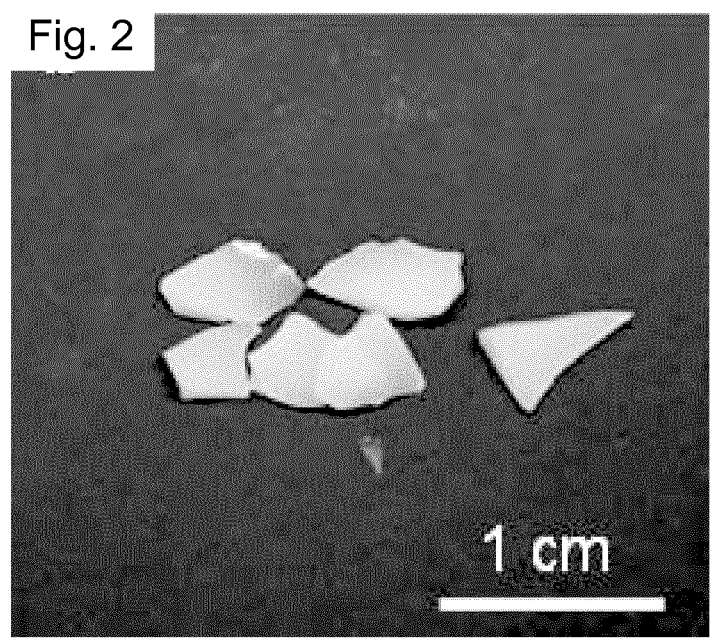
FIG. 2 shows a representative image of SnO$_2$@$_{mono}$ZIF-8, according to an embodiment of the invention.
Figure 3:
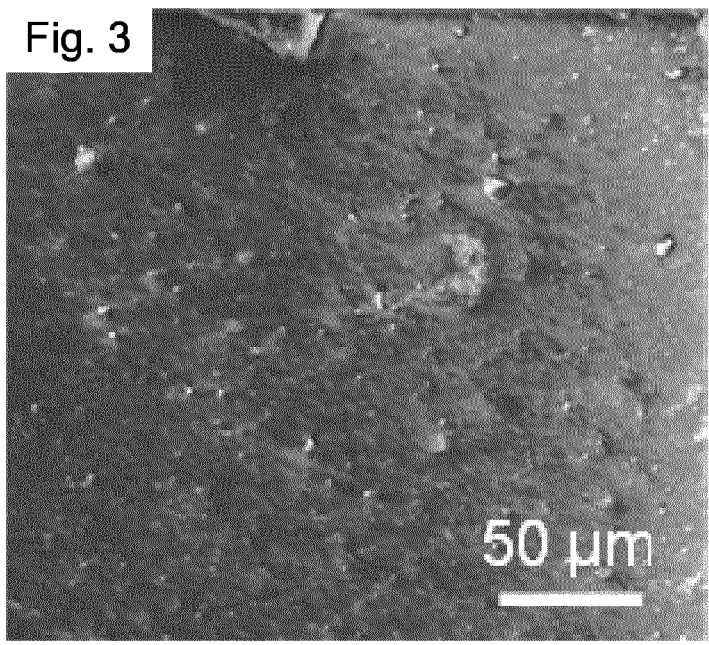
Figure 4:
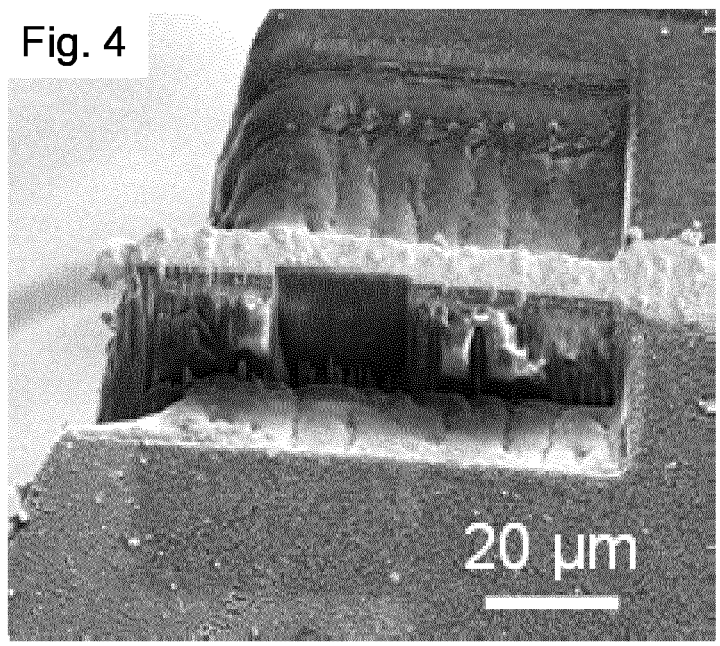

We chose SnO$_2$—NPs for encapsulation due to their non-toxic nature and track record in detoxification [Refs. 12, 13]. This photocatalyst, however, is considered to present major problems of recovery and reuse owing to the small size of the NPs [Ref. 14]. The synthesis of SnO$_2$—NPs resulted in uniform, monocrystalline NPs with a mean size distribution of ca. 5.0±1.1 nm (FIGS. 10-13). These were incorporated into ZIF-8 monoliths during its sol-gel synthesis; whereas pure ZIF-8 monoliths ($_{mono}$ZIF-8) were transparent (FIG. 1), SnO$_2$@$_{mono}$ZIF-8 appears white (FIG. 2). Scanning electron microscopy (SEM) analysis of SnO$_2$@$_{mono}$ZIF-8 revealed a similar flat surface morphology to that previously reported for $_{mono}$ZIF-8 (FIG. 3) [Ref. 15]. Transmission electron microscopy (TEM) analysis of the mother liquor revealed a primary particle size for SnO$_2$@$_{mono}$ZIF-8 (100-150 nm) larger than that for $_{mono}$-

ZIF-8 (60-80 nm) (FIGS. 14 and 15); suggesting ZIF-8 exhibits slower nucleation in the presence of $SnO_2$—NPs [Ref. 15].

Figure 10:
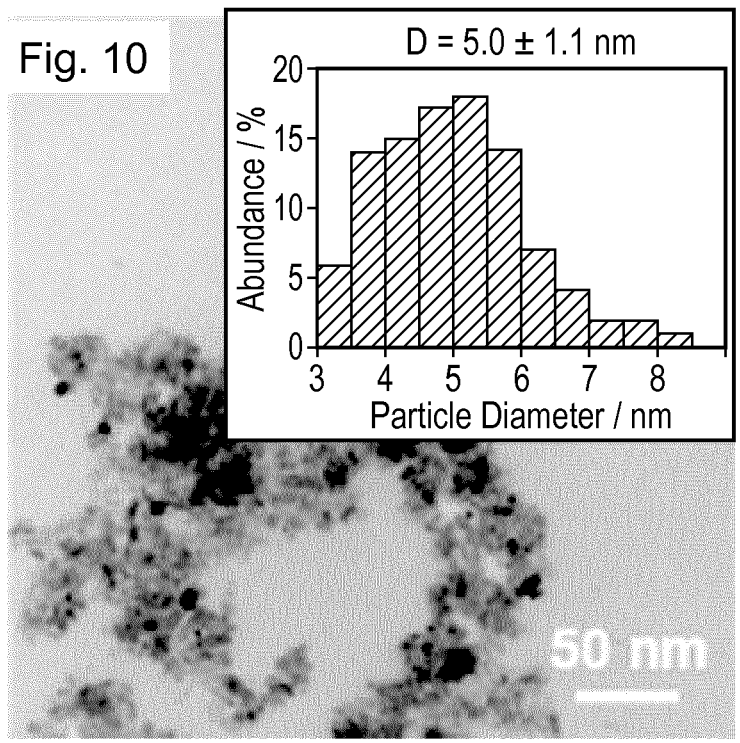
FIGS. 10 and 11 show representative bright field TEM (scale bar 50 nm in FIG. 10 and scale bar 20 nm in FIG. 11) micrographs of SnO$_2$ nanoparticles. The inset in FIG. 10 shows particle size distribution, the error for which is calculated using standard deviation over 100 values of particle diameters. The inset image in FIG. 11 shows an HRTEM image (scale bar 5 nm).
Figure 11:
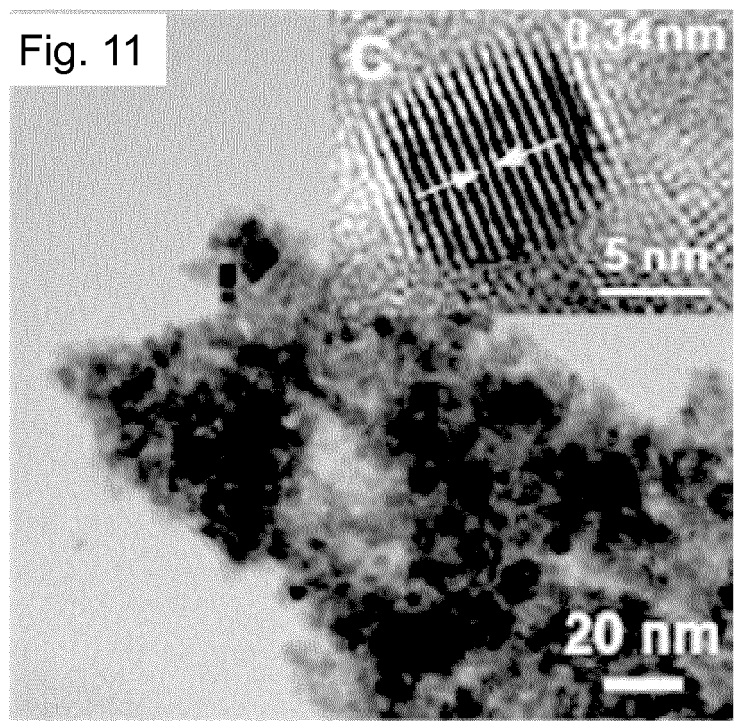

We confirmed the composition of $SnO_2@_{mono}$ZIF-8 using energy-dispersive X-ray spectroscopy (EDX). FIGS. 16 and 17 show representative scanning transmission electron microscopy (STEM) images indicating the presence of bright spots within the monolithic matrix. These present some agglomeration at the local level but are well distributed through the monolith. By using EDX (FIG. 18) we confirmed the chemical nature of the $SnO_2$ bright spots, so demonstrating the successful encapsulation of $SnO_2$—NPs. We further investigated the sub-surface features of the monolith and the presence of the $SnO_2$—NPs using focused ion beam (FIB)-SEM. FIGS. 3-6 show images obtained during etching, revealing $SnO_2$ agglomerates dispersed throughout the monolithic matrix. By providing a solid surface to which nanoparticles with high interfacial energies can adhere, $_{mono}$ZIF-8 has prevented the worst excesses of NP agglomeration (FIGS. 10 and 11). We found the level of $SnO_2$—NP loading to be 2.0±0.1 wt. % (Table S1).

Figure 7:
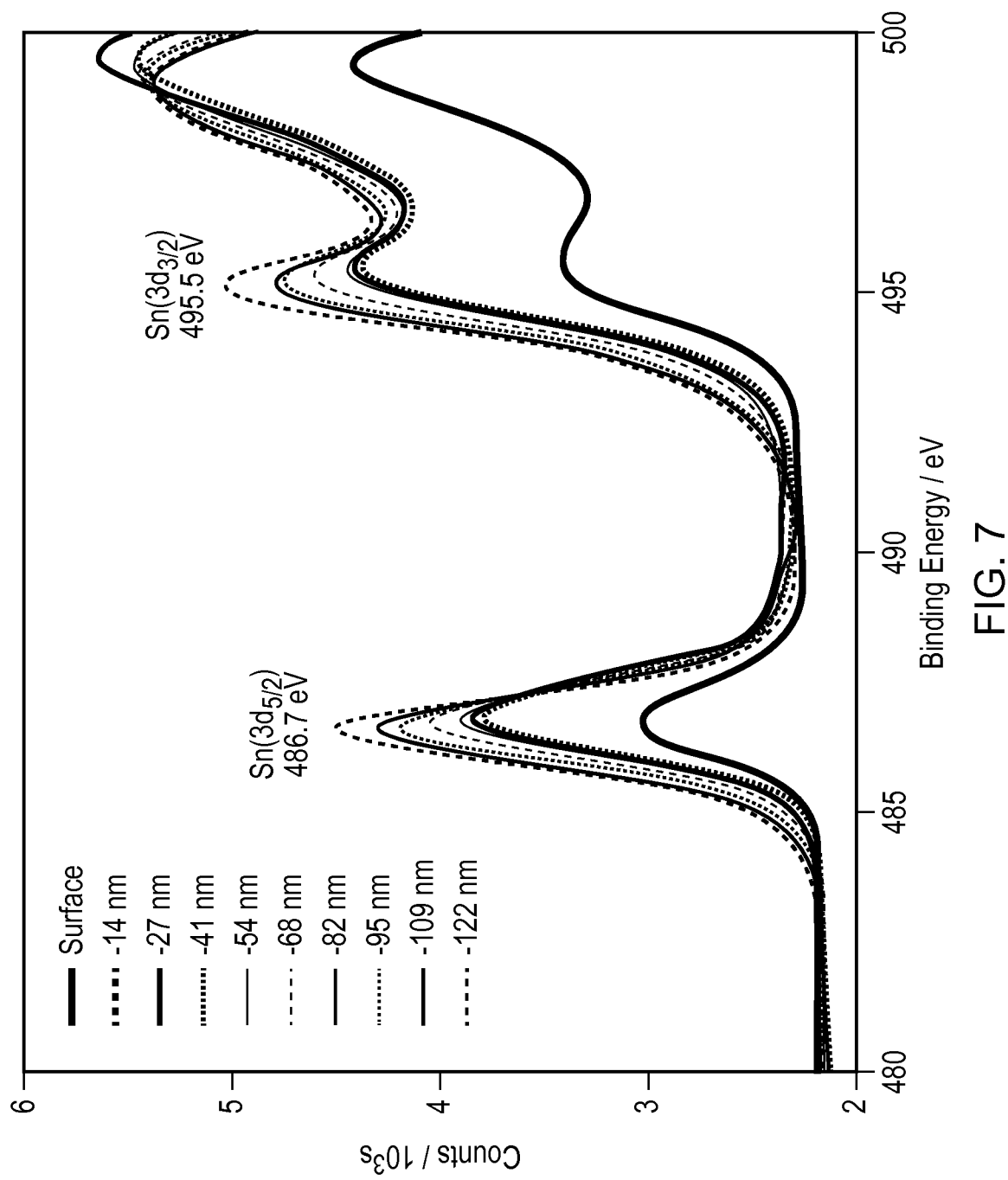
FIG. 7 shows FIB-XPS binding energy spectra for the 3d region of Sn(IV) in SnO$_2$@$_{mono}$ZIF-8. The indicated peak energies are calculated as an average over the 10 spectra.

X-ray photoelectron spectroscopy (XPS) confirmed the results of FIB-SEM. FIG. 7 shows the FIB-XPS analysis of the 3d region of Sn(IV). This revealed peaks attributable to $Sn(3d_{5/2})$ and $Sn(3d_{3/2})$ binding energies, centred at 486.7 and 495.5 eV, respectively, confirming the presence of $SnO_2$ [Ref. 16]. The high energy shoulder on the $Sn(3d_{3/2})$ peak is attributed to the presence of ZIF-8 [Ref. 17]. Encouragingly, we detected Sn consistently throughout the etched areas, whilst the external surface spectrum revealed a lower Sn presence. This supports the FIB-SEM micrographs and confirms that minimal $SnO_2$ is present at the monolith external surface. Discussion of the remaining XPS data is set out further below.

Figure 8:
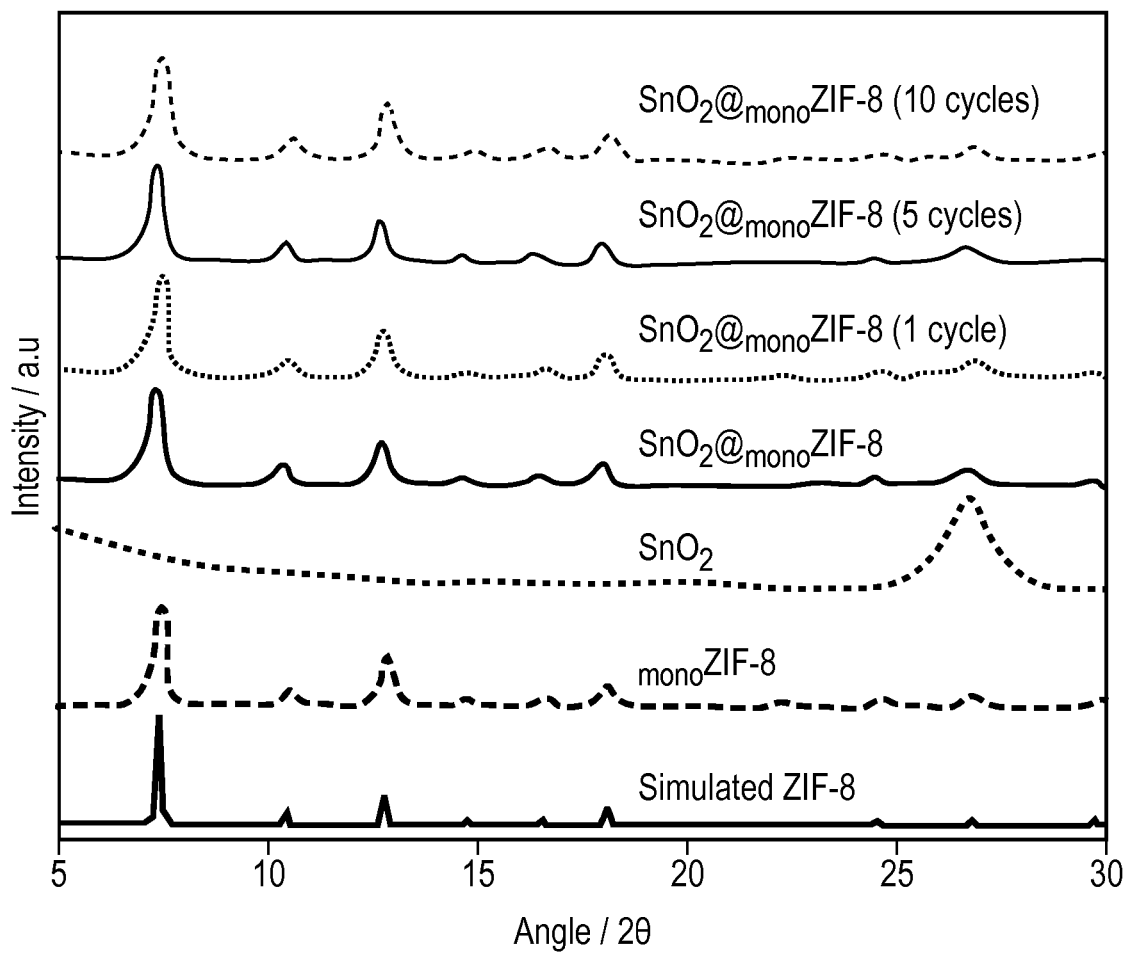
FIG. 8 shows PXRD patterns of simulated and experimental $_{mono}$ZIF-8, SnO$_2$—NPs, and SnO$_2$@$_{mono}$ZIF-8 fresh and after 1, 5 and 10 catalytic cycles.

FIG. 8 compares the PXRD patterns of simulated ZIF-8 with experimental $_{mono}$ZIF-8, $SnO_2$—NPs, and $SnO_2@_{mono}$ZIF-8. Fresh $SnO_2@_{mono}$ZIF-8 revealed minimal peak variation compared to $_{mono}$ZIF-8, confirming that the $SnO_2$—NPs do not perturb the crystallinity of the MOF. FIG. 20 shows the $N_2$ adsorption isotherms for the composite; Table 1 compares the Brunauer-Emmett-Teller (BET) areas, and the micropore and total pore volumes. Both $_{mono}$ZIF-8 and $SnO_2@_{mono}$ZIF-8 display typical stepped ZIF-8 adsorption isotherms and an absence of mesoporosity [Ref. 2]. However, the adsorption capacity and BET area of the composite is about 25% lower than that of $_{mono}$ZIF-8. This is attributed to pore blocking from non-porous phases. Mercury porosimetry revealed the bulk density (envelop or particle density) of $SnO_2@_{mono}$ZIF-8 to be slightly higher than that of $_{mono}$ZIF-8, i.e. 1.13 g cm$^{-3}$ vs. 1.05 g cm$^{-3}$.

TABLE 1

BET areas ($S_{BET}$), micropore volumes ($W_0$), and total pore volumes ($V_{TOT}$) for $_{mono}$ZIF-8 and $SnO_2@_{mono}$ZIF-8 before and after exposure to MB and $H_2O$.

| Material | $S_{BET}$ [m$^2$g$^{-1}$] | $W_0^{[a]}$ [cm$^3$ g$^{-1}$] | $V_{TOT}^{[b]}$ [cm$^3$ g$^{-1}$] |
|---|---|---|---|
| $_{mono}$ZIF-8 | 1423 | 0.543 | 0.546 |
| $SnO_2@_{mono}$ZIF-8 | 1055 | 0.413 | 0.417 |
| $SnO_2@_{mono}$ZIF-8 - 1 cycle (MB) | 1068 | 0.421 | 0.427 |
| $SnO_2@_{mono}$ZIF-8 - 5 cycle (MB) | 985 | 0.389 | 0.393 |
| $SnO_2@_{mono}$ZIF-8 - 10 cycle (MB) | 1027 | 0.405 | 0.411 |
| $SnO_2@_{mono}$ZIF-8 - 1 cycle ($H_2O$) | 973 | 0.384 | 0.389 |
| $SnO_2@_{mono}$ZIF-8 - 5 cycle ($H_2O$) | 991 | 0.389 | 0.393 |
| $SnO_2@_{mono}$ZIF-8 - 10 cycle ($H_2O$) | 996 | 0.395 | 0.399 |

[a]Data obtained at $P/P_0 = 0.1$
[b]$P/P_0 = 0.99$.

Figure 9:
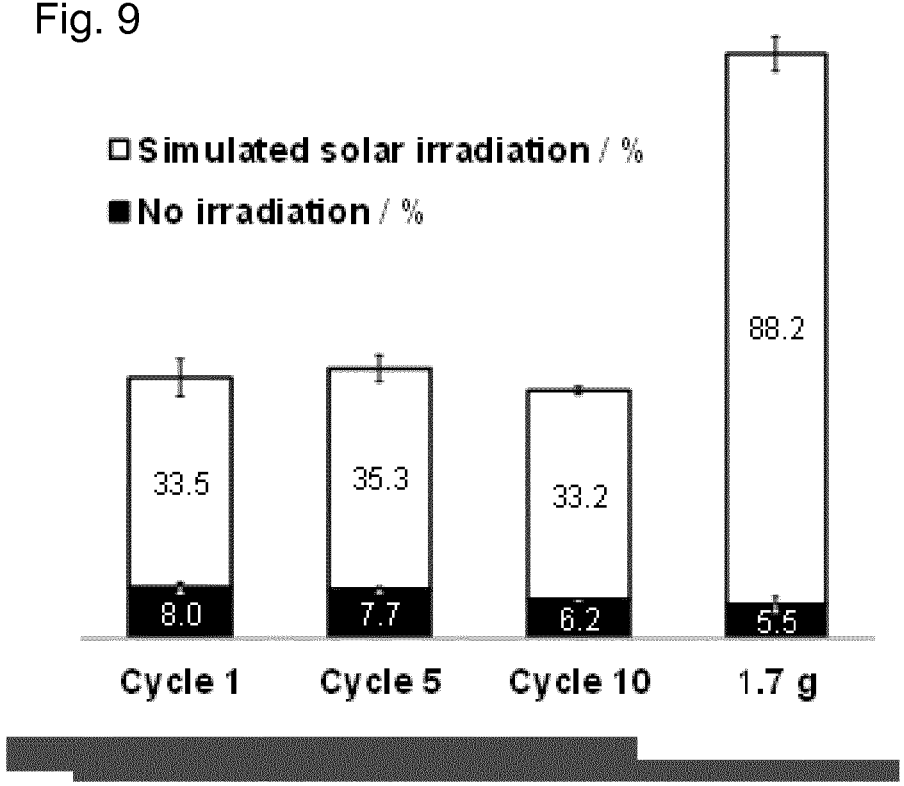
FIG. 9 shows the degradation of aqueous MB (25 mL, 1.55×10$^{-5}$ M) in the presence of 0.4 g (cycles 1, 5, 10) and 1.7 g of SnO$_2$@$_{mono}$ZIF-8.

We assessed the photocatalytic activity of $SnO_2@_{mono}$ZIF-8 using aqueous methylene blue (MB) over multiple catalytic cycles. Each cycle lasted 3 hours, with the composite recovered each time by simple gravity filtration (FIG. 23) before being reused without washing. MB (dimensions: 7.9×16.3×4.0 Å) [Ref. 18] is widely used in the textile industry and represents a common toxic effluent in water supplies [Ref. 19]. By using a dye larger than the apertures of ZIF-8 (i.e. 3.4 Å) [Ref. 2], we have explored the accessibility of the $SnO_2$—NPs. FIG. 9 shows the degradation of MB in the presence of different amounts of $SnO_2@_{mono}$ZIF-8 (see also FIG. 25). Low loading experiments utilizing 0.4 g of composite (i.e. 53 μmol of $SnO_2$—NP) proved $SnO_2@_{mono}$ZIF-8 to be moderately photoactive, with an average of 41.5±3.0% MB degradation achieved in 3 hours. Importantly, the catalytic performance was sustained, with 39.4±0.6% MB degradation achieved in the 10$^{th}$ cycle, providing compelling evidence for NP retention in the composite. When increasing the loading to 1.7 g of composite (i.e. 225 μmol catalyst), MB degradation increased to 93.6±2.7% in 3 hours. This is a substantial improvement on previously reported semiconducting nanoparticle-ZIF-8 hybrid materials [Ref. 11]. Previous studies suggest that to achieve appreciable degradation of a dye under comparable conditions, 150-300 μmol of powdered photocatalytic nanoparticles are typically required [Ref. 20].

Interestingly, although the narrow apertures of ZIF-8 preclude the passage of MB, this is not a barrier to photocatalysis. Houas et al. have proposed the following mechanism [Ref. 19], where intimate contact between $SnO_2$—NPs and dye is not necessary:

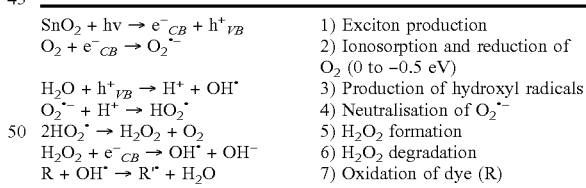

| | |
|---|---|
| $SnO_2 + h\nu \rightarrow e^-_{CB} + h^+_{VB}$ | 1) Exciton production |
| $O_2 + e^-_{CB} \rightarrow O_2^{\cdot-}$ | 2) Ionosorption and reduction of $O_2$ (0 to −0.5 eV) |
| $H_2O + h^+_{VB} \rightarrow H^+ + OH^{\cdot}$ | 3) Production of hydroxyl radicals |
| $O_2^{\cdot-} + H^+ \rightarrow HO_2^{\cdot}$ | 4) Neutralisation of $O_2^{\cdot-}$ |
| $2HO_2^{\cdot} \rightarrow H_2O_2 + O_2$ | 5) $H_2O_2$ formation |
| $H_2O_2 + e^-_{CB} \rightarrow OH^{\cdot} + OH^-$ | 6) $H_2O_2$ degradation |
| $R + OH^{\cdot} \rightarrow R^{\cdot} + H_2O$ | 7) Oxidation of dye (R) |

In this mechanism, the species active in dye degradation derive from adsorbed oxygen and water [Ref. 14]. In our case, we propose that water, with a 2.68 Å kinetic diameter [Ref. 21], diffuses through the ZIF-8 windows [Ref. 22] and interacts with $SnO_2$. Reaction with the photoinduced excitons (electrons, e$^-$, and holes, h$^+$) in the conduction (CB) and valence (VB) bands of the NPs then creates the hydroxyl and superoxide radicals required for dye degradation. The high levels of photocatalytic activity achieved using $SnO_2@_{mono}$ZIF-8 suggest that $SnO_2$ far below the monolith surface, and not only that present at the external surface, must be intrinsically involved in the catalytic cycle.

We evaluated the chemical robustness of $SnO_2@_{mono}$ZIF-8 by PXRD and $N_2$ adsorption. PXRD patterns of the composite after 1, 5 and 10 photocatalytic cycles showed no significant variations from that of fresh composite (FIG. 8). However, the adsorption isotherms of $N_2$ showed a decrease in the BET area (Table 1 and FIGS. 21 and 22). We obtained similar values of decrease in BET areas when measuring the adsorption properties of fresh composite after submersion in water for 3-hour cycles, strongly suggesting that the decrease is due to the decomposition of $SnO_2$@ZIF-8 in water rather than MB adsorption.

Industrial applications require that materials possess the mechanical strength and toughness to withstand the stresses of friction, cyclic compression or vibration within a container. We used the nanoindentation technique to establish that the magnitudes of both the Young's modulus, E, and Hardness, H, of $SnO_2$@$_{mono}$ZIF-8 (3.30±0.01 GPa and 0.44±0.01 GPa, respectively) were about 10% greater than those of $_{mono}$ZIF-8 (3.00±0.01 GPa and 0.41±0.01 GPa, respectively), thereby rendering the composite structurally stiffer and more resistant to permanent deformation (FIGS. 26-34). This is likely attributable to the incorporation of the $SnO_2$—NPs, leading to a greater packing efficiency of the primary particles [Ref. 23]. $SnO_2$@$_{mono}$ZIF-8 was found by thermogravimetric analysis (FIG. 35) to decompose at a lower temperature (450-500° C.) than $_{mono}$ZIF-8 (600° C.). Importantly, however, the thermal stability of the composite far exceeds the application temperature and is not reduced after recycling.

In summary, we report a chemically and mechanically robust composite in which $SnO_2$—NPs have been controllably integrated into a monolithic metal-organic framework without the need for binders, additives or high pressures, so avoiding structural amorphization and pore collapse. $SnO_2$@$_{mono}$ZIF-8 has shown high levels of photocatalytic activity and extraordinary recyclability when compared to powdered nanoparticles or previously reported NP@MOF composites. Furthermore, the straightforward synthetic method used led to the immobilization of nanoparticles in a way that prevented high degrees of agglomeration. The outstanding level of recyclability coupled with the unprecedented degree of dye degradation seen under high loading of the composite has proven $SnO_2$@$_{mono}$ZIF-8 to be a highly effective photocatalyst.

Synthesis of $SnO_2$ Nanoparticles $SnO_2$—NPs were prepared following a modified literature synthesis [Ref. 24]. $SnCl_4.5H_2O$ (0.787 g, 2.24 mmol) was dissolved in water (15 mL). Sodium hydroxide (0.7 g, 17.5 mmol) was dissolved in water (20 mL) and ethanol (20 mL). This was added dropwise to the stannic chloride solution until a pH of 12 was achieved. The mixture was transferred quantitatively (ca. 40 mL) to an autoclave and hydrothermally treated (200° C., 24 hours). After cooling, the resultant precipitate was separated and washed with water and 1:1 ethanol/water mix under centrifugation (7000 rcf). The washed sample was dried in a desiccator overnight, yielding $SnO_2$—NPs as a white powder.

Synthesis of $SnO_2$@$_{mono}$ZIF-8 Monoliths $Zn(NO_3)_2.6H_2O$ (0.293 g, 0.985 mmol) was dissolved in ethanol (20 mL). 2-methylimidazole ($C_4H_6N_2$) (0.809 g, 9.85 mmol) was dissolved separately in ethanol (20 mL), and $SnO_2$—NPs were added (30 mg, 0.198 mmol). Both solutions were ultrasonicated for 20 minutes before being combined. The resulting mixture was stirred for 15 minutes at room temperature then centrifuged (4250 rcf, 10 minutes). The collected solid was washed in ethanol (20 mL, 3 times) and the pellet dried at room temperature overnight, yielding a solid monolith. This was ground into 1-5 mm pieces before activation at 110° C. in a vacuum oven overnight.

Characterization of Materials $Zn(NO_3)_2.6H_2O$ (98%) and 2-methylimidazole (97%) were purchased from Alfa Aesar; ethanol (>99.5%), $SnCl_4.5H_2O$ and methylene blue were purchased from Sigma-Aldrich; NaOH pellets (>97%) were purchased from Fischer Scientific. Chemicals were used as received, without further purification. $SnO_2$@$_{mono}$ZIF-8 was characterised utilising: focused ion beam-X-ray photoelectron spectroscopy (FIB-XPS), focused ion beam-scanning electron microscopy (FIB-SEM), transmission electron microscopy (TEM), scanning transmission electron microscopy-energy dispersive X-ray spectroscopy (STEM-EDX), thermogravimetric analysis (TGA), powder X-ray diffraction (PXRD), $N_2$ adsorption isotherms at 77 K, mercury porosimetry, nanoindentation studies, attenuated total reflectance FT infrared spectroscopy (FT-IR), inductively coupled plasma-optical emission spectroscopy (ICP-OES) and elemental analysis (EA) techniques.

Photocatalytic properties were explored by monitoring the degradation of model organic volatile methylene blue (MB) under simulated solar irradiation produced by a 150 W xenon lamp fitted with an air mass 1.5 global (AM 1.5 G) filter (Solar Simulator model LSO106, 1 sun illumination, 100 mW cm$^{-2}$). The degradation of aqueous MB (25 mL, 1.55×10$^{-5}$ M, pH 7.30) was recorded by monitoring the reduction in $\lambda_{max}$ at 664 nm using a BOECO S-22 and a Perkin Elmer Lambda 750 UV/vis/NIR spectrometer for single and multi-wavelength measurements, respectively. An ice-cold water bath prevented dye evaporation under impeding light and thermal dye degradation. Control experiments were run (i) without irradiation in the presence of $SnO_2$@$_{mono}$ZIF-8 and (ii) with irradiation in the absence of composite. Low loading experiments used 0.4 g of composite, whilst high loading sets used 1.7 g. Composite was collected under gravity filtration and dried under ambient conditions overnight before recycling. Each cycle under solar irradiation was performed parallel to a control in the dark, administering the same recycling procedure. All experiments were triplicated. Hydroxyl radicals produced during photocatalysis were detected using a terephthalic acid probe.

PXRD patterns were measured on a PANalytical Empyrean diffractometer fitted with an X'celerator detector and using a Cu-K$\alpha_1$ ($\lambda$=1.5406 Å) source with a step size of 0.002° and a scanning speed of 0.022° s$^{-1}$ at 40 kV and 40 mA. SEM images were obtained on a FEI Helios Nanolab with an accelerating voltage of 5 keV. TEM images were collected on a FEI Tecnai G2 and a FEI Osiris S/TEM operated in scanning mode with an accelerating voltage of 200 keV. For the TEM images of the mother liquor, a 1 mL sample of the reaction medium was withdrawn after 15 minutes and diluted 10 times in ethanol. 25 μL of the resulting solution was drop-coated onto a copper grid and the ethanol evaporated at room temperature. For high angle annular dark field (HAADF) images and EDX analysis the monolithic sample was pressed into a copper grid, with the EDX signal collected using a set of Bruker Super-X detectors. Thermogravimetric analyses were performed on TA Instruments TGA 500, ranging from room temperature to 750° C. in nitrogen, using a ramp rate of 10° C. min$^{-1}$. $N_2$ adsorption isotherms were obtained at 77 K using a Micrometrics 3 Flex instrument. All samples were degassed in situ at 110° C. for 6 hours before measurement. The recycled $SnO_2$@$_{mono}$ZIF-8 samples were not washed after photocatalysis. Mercury porosimetry data was obtained using an AutoPore IV 9500 instrument employing pressures up to 2000 bar. An Exeter analytical CE 440 elemental analyser at a combustion temperature of 975° C. was utilised for C, H, and N analysis whilst Zn and Sn analysis was performed on a Thermo Scientific iCAP 7400 ICP-OES analyser against 1 ppm and 10 ppm standards. $SnO_2@_{mono}ZIF$-8 was filtered, soaked in deionised water, and dried under conventional and vacuum oven environments before elemental analyses were performed again. FIB-XPS measurements were obtained using a Thermo Scientific K-Alpha system. The binding energy was calibrated internally based on the C(1s) line position. Each etch was conducted at full power (ion energy=3000 eV, current='high') for 20 seconds. The estimated sputter rate of the $Ta_2O_5$ source was 0.68 nm sec$^{-1}$, leading to an estimated total etching depth of 122 nm, whilst the diameter of the area analysed was 400 μm. FT-IR spectra were collected on a Thermo Scientific Nicolet iS50 FT-IR spectrometer in ATR mode. Nanoindentation measurements were performed using an MTS Nano Indenter XP system equipped with a Berkovich diamond tip. The continuous stiffness method was employed and epoxy mounted monolithic samples were indented up to a maximum surface penetration depth of 2000 nm, in accordance with the established methodology for characterizing MOFs [Ref. S1], taking Poisson's ratio of 0.33 [Ref. S2], to determine the upper bounds of Young's modulus, E. In photocatalytic experiments, 3 mL aliquots taken at 15-minute intervals over three hours gave the concentration of dye as a function of time. Each aliquot was returned to the original dye solution immediately after analysis. Hydroxyl radicals (OH$^\bullet$) produced during photocatalysis were detected by dispersing 0.4 g of $SnO_2@_{mono}ZIF$-8 in a basic aqueous solution of terephthalic acid (10$^{-4}$ M). The solution was exposed to simulated solar irradiation and the maximum fluorescence emission intensity of 2-hydroxyterephthalic acid measured after excitation at 315 nm.

The diffraction pattern (FIG. 12) was analyzed using the Scherrer (Equation S1) and Williamson-Hall (Equation S2) equations to give estimates of particle size by accounting for size and strain broadening.

$$D = \frac{K\lambda}{\beta\cos\theta} \quad \text{(Equation S1)}$$

$$\beta\cos\theta = \frac{k\lambda}{D} + \eta\sin\theta \quad \text{(Equation S2)}$$

where D is the mean crystallite size, β is the full-width-at-half-maximum (FWHM) in radians, θ is the angle in degrees, λ is the wavelength of incident radiation (1.5406 Å for the Cu-Kα$_1$ source), η is the strain in the crystallite lattice, K is the dimensionless shape factor and k is a constant, typically close to unity [Ref. S3].

The (110), (211), (112), (202) and (200) peaks were utilized in the Williamson-Hall analysis (Equation S2), assuming a constant of unity.

$$\frac{\beta\cos\theta}{\lambda}$$

was plotted against $$\frac{\sin\theta}{\lambda}$$

to give an intercept of $$\frac{1}{D}$$

and gradient η, which were used to determine crystallite size and lattice strain respectively.

Figure 12:
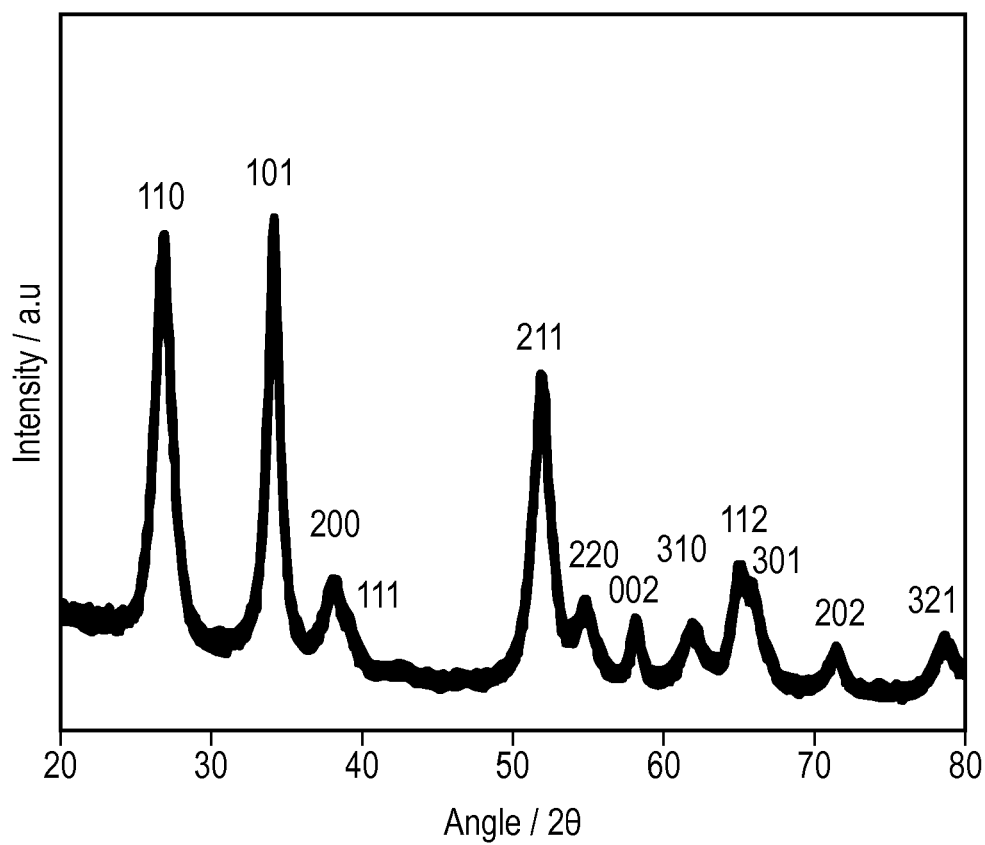
FIG. 12 shows an indexed X-ray powder diffraction pattern of SnO$_2$ nanoparticles prepared using a hydrothermal method.
Figure 13:
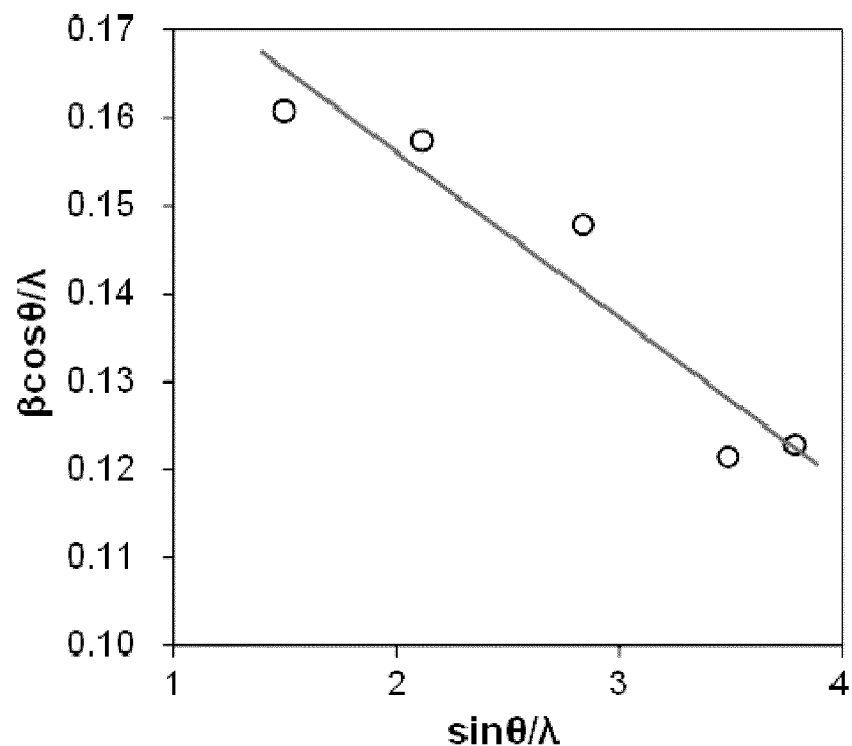
FIG. 13 shows a Williamson-Hall plot of $$\frac{\beta \cos\theta}{\lambda}$$

Peak broadening in the PXRD pattern indicated small particle size, with the Scherrer formula (Equation S1) giving an average crystallite size of 5.03 nm, assuming a dimensionless shape factor of 0.89 (FIG. 12). It is important to note that this gives a lower limit for particle size. The value is in close agreement with results obtained from the Williamson-Hall plot [Ref. S4], which gives an average crystallite size of 5.17 nm and a strain of −0.0188 (FIG. 13). This negative strain value indicates a compressive lattice strain in the nanoparticles. Diffraction peaks were indexed to the tetragonal crystal structure known to be associated with $SnO_2$ using the (200) and (002) peaks, producing lattice parameters, a=4.729 Å and c=3.172 Å, in good agreement with reported values (JCPDS card no. 41-1445).

$SnO_2 @_{mono}ZIF$-8 Analysis

TABLE S1

Chemical microanalyses of $_{mono}ZIF$-8 (simulated and experimental) and fresh $SnO_2@_{mono}ZIF$-8 based on nitrogen and tin contributions acquired from elemental analysis and ICP-OES data. Errors were determined using the standard deviation in triplicated Sn and N wt % values with zero readings occurring due to numerical rounding. Deviation from 100% total loading is attributed to residual reagents and solvents trapped in the materials.

| Materials | Composition Wt. % | | | | | | |
|---|---|---|---|---|---|---|---|
| | C | H | N | Sn | Zn | $SnO_2$ | ZIF-8 |
| Sim. ZIF-8 | 42.2 | 4.4 | 24.6 | — | 28.7 | — | 100 |
| Exp. $_{mono}ZIF$-8 | 41.7 ± 0.0 | 4.5 ± 0.0 | 24.4 ± 0.3 | — | 26.2 ± 0.4 | — | 99.0 ± 1.1 |
| $SnO_2@_{mono}ZIF$-8 | 40.5 ± 0.4 | 4.6 ± 0.1 | 23.1 ± 0.3 | 1.6 ± 0.1 | 24.5 ± 0.4 | 2.0 ± 0.1 | 93.9 ± 1.2 |

The O(1s) etched levels revealed a peak at 530.6 eV, characteristic of lattice oxygen in $SnO_2$ (FIG. 19c) [Ref. S5]. Individual spectra of the remaining elements of interest (FIGS. 19a, 19b and 19d for Zn, N and C spectra, respectively) as well as survey spectra (FIG. 20) showed similar homogeneity and consistent peak distribution throughout the etched areas of the composite. The O(1s) spectra (FIG. 19c) revealed a higher percentage of oxygen at the unetched MOF surface than at the subsequently etched levels. This is attributed to oxygen adsorption at the composite surface with a binding energy of 531.8 eV [Refs. S6, S7]. Asymmetric broadening in the O(1s) spectra represents oxygen physically adsorbed to the $SnO_2$—NPs [Ref. S8].

Inspection of the cavity dimensions of pure ZIF-8 (11.6 Å) indicates that the nanoparticles do not reside in the MOF pores, which are too small to accommodate them. Instead, the nanoparticles are encapsulated by the grown ZIF-8 matrix.

Control experiments for the photocatalytic degradation of MB were performed: (i) without solar irradiation in the presence of composite ($SnO_2@_{mono}ZIF$-8) and (ii) with solar irradiation in the absence of composite (FIGS. 24 and 25). A final control experiment, (iii), was conducted to assess the photocatalytic properties of $_{mono}ZIF$-8. Low loading and high loading experiments were performed using 0.4 and 1.7 g of composite or $_{mono}ZIF$-8, respectively. The recyclability was demonstrated by reassessing catalytic activity with fresh dye solution for nine further cycles. Each cycle under solar irradiation was performed parallel to control (i), administering the same gravity filtration recycling procedure in each case.

The degree of degradation was calculated according to the reduction in absorption for the major MB absorption band at $\lambda_{max}=664$ nm over 3 hours:

$$\text{Degradation}/\% = 100 \times \left(1 - \frac{C_t}{C_0}\right) \quad \text{(Equation S3)}$$

where $C_0$ is the starting concentration of MB and $C_t$ is the concentration of MB after time t.

Triplicated data indicate an average degradation of 18.3±1.4% under simulated solar irradiation in the absence of composite. Error is calculated from the standard deviation in triplicated values. A number of MOFs are known to have photocatalytic properties of their own [Refs. S9 and S10], with the partial degradation of MB under nanoparticulate ZIF-8 previously attributed to the wide band gap of the semiconducting material. This was explained by the proposed ligand-to-metal-charge-transfer (LMCT) of a 2p HOMO electron from the nitrogen linker into the empty zinc LUMO orbital under stimulation from a UV source [Refs. S11 and S12]. For these reasons it was essential to establish whether $_{mono}ZIF$-8 represented a source of potential dye degradation in the current work. Triplicated control experiment (iii) revealed that $_{mono}ZIF$-8 presents no photocatalytic behavior under simulated solar irradiation, with measured dye degradation attributable to surface physisorption. This is consistent with literature solid-state UV-Vis data for powdered ZIF-8, which suggests that a large band gap of 4.9 eV prevents exciton formation under solar irradiation [Ref. S13]. However, inspection of the valence and conduction band potentials of $SnO_2$ reveals that they are positioned such that production of hydroxyl and superoxide radicals, the key species responsible for dye degradation [Refs. S14 and S15], is thermodynamically viable [Ref. S16].

The thermal stability of fresh and recycled $SnO_2@_{mono}ZIF$-8 was measured by TGA. We found that the decomposition temperature for $SnO_2@_{mono}ZIF$-8 (450-500° C.) is lower than that of $_{mono}ZIF$-8 (600° C.). This is expected due to the nanoparticles disrupting the coordination bonds within the MOF, promoting thermal decomposition [Ref. S17]. FIG. 35 shows an initial weight loss of 2.5%, 4.0%, 4.5%, 4.5% and 5.5% at 250° C. for $_{mono}ZIF$-8, fresh $SnO_2@_{mono}ZIF$-8 and $SnO_2@_{mono}ZIF$-8 after 1, 5 and 10 catalytic cycles, respectively. As $SnO_2$ is very thermally stable, the initial weight loss is attributed to ethanol and water adhered to the pure nanoparticles and trapped in the composite materials.

Even allowing for their flexibility, the narrowness of the 3.4 Å windows of ZIF-8 suggests that the dye cannot pass through its framework apertures. Dye adsorption is thought to occur predominantly via physisorption to the external surface of the monoliths rather than via chemisorption or coordination to zinc clusters [Refs. S6 and S18]. Spectra for $SnO_2$, $_{mono}ZIF$-8, fresh $SnO_2@_{mono}ZIF$-8 and $SnO_2@_{mono}ZIF$-8 after 10 catalytic cycles were recorded in the range of 400-4000 $cm^{-1}$ (FIGS. 36 and 37). Whilst $SnO_2$ displays peaks at 1641 and 3337 $cm^{-1}$ corresponding to bending and stretching modes of adsorbed water [Refs. S19 and S20], respectively, the characteristic peaks of the stretching vibrations of Sn—O at 463 and 608 $cm^{-1}$ are not visible in the $SnO_2@_{mono}ZIF$-8 spectrum [Refs, S21 and S22]. This is attributed to the relatively low loading of the nanoparticles. Importantly, the key peaks associated with the bending (1668 $cm^{-1}$) and stretching (1583 $cm^{-1}$) vibrations of N—H [Ref. S23] as well as the Zn—N stretching vibration [Ref. S24] (420 $cm^{-1}$) and ring stretch region [Ref. S25] (550-1500 $cm^{-1}$) in $SnO_2@ZIF$-8 do not differ in magnitude or frequency on going from the fresh to the cycled composite, suggesting no disruption of the composite bonding regime after exposure to MB dye. Furthermore, no evidence of a NH—O peak [Ref. S26] (3370 $cm^{-1}$), Zn—O peak [Ref. S6] (478 $cm^{-1}$) is observed in the spectrum of the cycled composite. These would be expected to be seen if the composite was exhibiting chemisorption to the degradation products of MB [Ref. S27]. This is consistent with there being no chemisorption of dye to the monolith surface.

A terephthalic acid (TA) probe was used to prove OH· radical production. Reaction of TA with OH· radicals generates the fluorescent species 2-hydroxyterephthalic acid. The formation of this molecule was monitored using the maximum intensity at 450 nm after excitation at 315 nm, and it was seen to increase with irradiation time (FIG. 38), indicating the photogeneration of OH·. This strongly endorses the photocatalytic mechanism proposed above.

The vol % of nanoparticles in the composite is determined based on the density of the nanoparticles, the wt % of the nanoparticles and the density of the composite. In the example of $SnO_2@_{mono}ZIF$-8, the nanoparticles of $SnO_2$ have density 6.95 g/cm³ and 2 wt % and the density of the composite is 1.13 g/cm³.

Relative Photonic Efficiency $\xi_r$

It is known in the art of photogenerated catalysis and catalysed photolysis that it can be important to provide for the reliable determination and comparison of the efficiency of a particular photocatalyst material to catalyse the degradation of a particular target molecule when subjected to a particular excitation radiation. Therefore in this disclosure the relative photonic efficiency $\xi_r$ of the nanoparticles is considered. The relative photonic efficiency $\xi_r$ of the nanoparticles can be represented as:

$$\xi_r = \frac{R^{in}(\text{nanoparticles})}{R^{in}(P25)}$$

wherein:

$R^{in}(P25)$ is the initial rate of degradation of 200 μM phenol in an air-equilibrated aqueous dispersion by standard titania particles (Degussa P-25 $TiO_2$) at 2 g/L under AM1 simulated sunlight radiation.

$R^{in}$(nanoparticles) is the initial rate of degradation of 200 μM phenol in an air-equilibrated aqueous dispersion by the nanoparticles (isolated from the MOF of the composite body) at 2 g/L under AM1 simulated sunlight radiation.

Other than the nature of the catalyst particles, the experiments to determine $R^{in}(P25)$ and $R^{in}$(nanoparticles) are carried out in identical experimental conditions. This follows the guidance for the determination of relative photonic efficiency $\xi_r$ given by Serpone and Salarino (1999) [Ref. S28], the entire content of which is hereby incorporated by reference.

In effect, therefore, r of the nanoparticles is determined relative to the corresponding photocatalytic efficiency of a standard catalyst (P-25 titania) to degrade a standard target molecule (phenol) under otherwise identical experimental conditions.

Degussa P-25 $TiO_2$ consists of two crystalline phases, with about 80% anatase and about 20% rutile and contains traces of $SiO_2$, $Al_2O_3$, HCl and Fe. It is nonporous with a BET specific surface area of about 55 $m^2$/g. The particle diameter is in the range 25 to 35 nm.

$R^{in}(P25)$ and $R^{in}$(nanoparticles) are tested using a method based on Kar et al. (2016) [Ref. S29]. The method is as follows. Composite containing 5.0 mg of catalyst (from ICP analysis) to be added to 25 mL of a $1.0 \times 10^{-5}$ M aqueous solution of dye (pH 7), and the mixture stirred in the dark for 2 hours to allow adsorption on the composite surface. Determine the absorption of a 3.0 mL aliquot of the mixture by UV-Vis to obtain the dye concentration before photocatalysis (C0) then return the aliquot to the reaction. Irradiate with a 150 W xenon lamp fitted with an air mass 1.5 global (AM 1.5 G) filter (1 sun illumination, 100 mW $cm^{-2}$). 3 mL aliquots to be taken at 15 minute intervals over 3 hrs to obtain the concentration of dye as a function of time by UV-Vis. Each aliquot to be returned to the original dye solution immediately after analysis. Use an ice cold water bath to prevent evaporation during catalysis and to avoid degradation due to heating. Two reference experiments, i) without light irradiation in the presence of catalyst, and ii) with light irradiation in the absence of catalyst should be done for comparison purposes. Composite to be collected under gravity filtration and dried under ambient conditions overnight before recycling for subsequent catalytic cycles. Each cycle under solar irradiation to be performed parallel to a control in the dark, administering the same recycling procedure. Hydroxyl radicals (OH*) produced during photocatalysis should be estimated using terephthalic acid as a probe molecule and an excitation wavelength of 315 nm. This method relies on the fluorescence signal at 425 nm of 2-hydroxyterephthalic acid.

In this method, the nanoparticles are tested in situ in the composite with the MOF. For strict adherence to the definition of the relative photonic efficiency r of the nanoparticles, the nanoparticles can be tested in an air-equilibriated aqueous dispersion, without MOF encapsulant. Where the nanoparticles are provided in the form of a composite with MOF, the nanoparticles can be isolated by digesting the MOF, e.g. at low pH. In the cases of the MOF being ZIF-8, a pH below 4-5 is suitable.

For further strict adherence to the definition of the relative photonic efficiency $\xi_r$ of the nanoparticles, the $1.0 \times 10^{-5}$ M aqueous solution of dye (pH 7) can be replaced with 200 μM phenol.

Further Experimental Work

We report here some additional experimental work that has been carried out to demonstrate further compositional embodiments. Specifically, the following materials were synthesised:

CdSe@ZIF-8$_{mono}$
Au@ZIF-8$_{mono}$
(PdO/TiO$_2$)@ZIF-8$_{mono}$
((Au@PdO)/TiO$_2$)@ZIF-8$_{mono}$
Pd@HKUST-1 $_{mono}$ CdSe@ZIF-8$_{mono}$ was synthesised by adapting the synthesis method for SnO$_2$@ZIF-8$_{mono}$ disclosed above, the adaptation being the use of CdSe nanoparticles. FIGS. 39 and 40 show TEM images for CdSe@ZIF-8$_{mono}$ whereas FIG. 41 shows powder XRD (PXRD) patterns for CdSe@ZIF-8$_{mono}$ (upper line) and for ZIF-8$_{mono}$ (lower line), confirming that the crystalline structure of ZIF-8$_{mono}$ is substantially unchanged by the incorporation of CdSe nanoparticles.

Au@ZIF-8$_{mono}$ was synthesised by adapting the synthesis method for SnO$_2$@ZIF-8$_{mono}$ disclosed above, the adaptations being the following: Synthesis of Au nanoparticles (NP): HAuCl$_4$.3H$_2$O (7.88 mg, 0.02 mmol) and trisodium citrate (5.88 mg, 0.02 mmol) were dissolved in DI water (80 mL) and mixed vigorously.

An ice-cold solution of NaBH$_4$ (9.08 mg, 0.24 mmol) in DI water (2.4 mL) was rapidly injected, causing the solution to turn from pale yellow to bright red/purple. The solution was mixed for 30 seconds at RT before PVP (10 k) (0.5 g) was added and mixed for a further 30 min. The water was removed under vacuum until 2 mL remained. The purple solution was diluted with distilled ethanol (18 mL).

For (PdO/TiO$_2$)@ZIF-8$_{mono}$, Pd/TiO$_2$ nanoparticles were synthesized as follows: Stearic acid (0.84 g, 2.95 mmol) was dissolved in a solution of ethanol (80 mL) and DI water (20 mL) at 85° C. under rapid stirring. Pd(acac)$_2$ (0.03 g, 0.1 mmol) was added and the resulting yellow solution was heated under reflux for 4 hours yielding a black solution. A solution of Ti(OBu)$_4$ (0.4 mL, 1.17 mmol) in ethanol (2 mL) was added dropwise to the rapidly mixing solution. The solution was maintained at reflux for a further 2 hours before being cooled to room temperature. The solution was collected under centrifugation (5.5 k RCF, 10 min) and washed in alternating water/ethanol (1:7, 2×40 mL) and ethanol (2×40 mL) solutions. The resulting NPs were suspended in ethanol (20 mL) and dried under vacuum overnight before being heated in a furnace at 500° C. for 3 hours, yielding a brown solid.

For ((Au@PdO)/TiO$_2$)@ZIF-8$_{mono}$, Au@PdO nanoparticles were first formed as follows: HAuCl$_4$.3H$_2$O (0.02 g, 0.05 mmol) was dissolved in DI water (2.5 mL) under sonication to give solution A. Na$_2$PdCl$_4$ (0.015 g, 0.05 mmol) was dissolved in DI water (2.5 mL) under sonication to give solution B. Solution A and B were mixed together and PVP(40 k) (0.067 g) was added. Under rapid stirring a solution of ascorbic acid (0.07 g, 0.04 mmol) in DI water (0.67 mL) was quickly injected, causing a colour change from bright orange to dark brown. The solution was sonicated for 5 mins before being left to rapidly mix for a further 6 hours at RT. The solution was centrifuged (5.5 k RCF, 20 min.) to obtain a black/brown solid which was washed with DI water (3×40 mL). The resulting NPs were dried under vacuum or re-suspended in DI water (20 mL) and sonicated for 30 mins.

Next, Au@PdO/TiO$_2$ nanoparticles were formed as follows:

The Au@PdO NP aqueous suspension (20 mL) was added to a solution of stearic acid (0.84 g, 2.95 mmol) in ethanol (80 mL) at RT. Under rapid stirring a solution of Ti(Obu)$_4$ (0.4 mL, 1.17 mmol) in ethanol (2 mL) was added dropwise. The resulting grey mixture was heated to 115° C. over 10 mins and maintained at this temperature for 2 hours. The solution was cooled to RT and washed in alternating water/ethanol (1:7, 2×40 mL) and ethanol (2×40 mL) solutions before being dried under vacuum. The resulting grey powder was heated in a furnace at 500° C. for 3 hours.

FIGS. 42, 43, 45 and 46 show TEM images for Au@ZIF-8$_{mono}$. The magnified image shown in FIG. 43 is of the area indicated in FIG. 42. FIG. 44 shows the particle size distribution of Au nanoparticles in Au@ZIF-8$_{mono}$. The measured average particle size of Au nanoparticles was 2.60±0.96 nm (assessed over 200 particles). The largest Au particles (very rarely seen) were never more than about 7 nm in diameter.

FIG. 47 shows a scanning transmission electron microscope—high-angle annular dark field (STEM-HAADF) image of (PdO/TiO$_2$)@ZIF-8$_{mono}$. FIGS. 48, 49 and 50 show elemental maps, for the particle imaged in FIG. 47, of Zn, Pd and Ti, respectively. FIG. 51 shows powder XRD (PXRD) patterns for (PdO/TiO$_2$)@ZIF-8$_{mono}$ (upper line) and for ZIF-8$_{mono}$ (lower line). Specific peaks of interest in the (PdO/TiO$_2$)@ZIF-8$_{mono}$ pattern are labelled. Via ICP-AES (Inductively Coupled Plasma Atomic Emission Spectroscopy), the proportions of Pd, Zn and N were found to be: Pd—0.7%, Zn—24.5%, N—21.1%. Via calculation, the amount of ZIF-8 was 85.3% and the amount of TiO$_2$ was 14%.

FIGS. 52, 53, 54 and 55 show elemental maps for Zn, Ti, Au and Pd, respectively for a ((Au@PdO)/TiO$_2$)@ZIF-8$_{mono}$ particle imaged via scanning transmission electron microscopy—high-angle annular dark field (STEM-HAADF). FIG. 56 shows powder XRD (PXRD) patterns for ((Au@PdO)/TiO$_2$)@ZIF-8$_{mono}$ (upper line) and for ZIF-8$_{mono}$ (lower line). Specific peaks of interest in the ((Au@PdO)/TiO$_2$)@ZIF-8$_{mono}$ pattern are labelled.

FIG. 57 shows a TEM image for Pd@HKUST-1$_{mono}$, whereas FIG. 58 shows the response of Pd@HKUST-1$_{mono}$ to thermogravimetric analysis (TGA).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above and/or listed below are hereby incorporated by reference.

LIST OF NON-PATENT DOCUMENT REFERENCES

[1] Y. Liu, Y. Ma, Y. Zhao, X. Sun, F. Gándara, H. Furukawa, Z. Liu, H. Zhu, C. Zhu, K. Suenaga, P. Oleynikov, A. S. Alshammari, X. Zhang, O. Terasaki, O. M. Yaghi1, *Science* 2016, 351, 365-369.

[2] D. Fairen-Jimenez, S. A. Moggach, M. T. Wharmby, P. A. Wright, S. Parsons, T. Düren, *J. Am. Chem. Soc.* 2011, 133, 8900-8902.

[3] D. Fairen-Jimenez, R. Galvelis, A. Torrisi, A. D. Gellan, M. T. Wharmby, P. A. Wright, C. Mellot-Draznieks, T. Düren, *Dalton Trans.* 2012, 41, 10752-10762.

[4] M. Jian, B. Liu, G. Zhang, R. Liu, X. Zhang, *Colloids Surfaces A Physicochem. Eng. Asp.* 2015, 465, 67-76.

[5] T. Tian, J. Velazquez-Garcia, T. D. Bennett, D. Fairen-Jimenez, *J. Mater. Chem. A* 2014, 3, 2999-3005.

[6] Y. Gao, J. Wu, W. Zhang, Y. Tan, J. Zhao, B. Tang, *Mater. Lett.* 2014, 128, 208-211.

[7] A. Ahmed, M. Forster, R. Clowes, P. Myers, H. Zhang, *Chem. Commun.* 2014, 50, 14314-14316.

[8] T. Berger, O. Diwald, *Photocatalysis: Fundamentals and Perspectives, Royal Society Of Chemistry, Cambridge,* 2016, pp 185-217.

[9] H. Fujii, M. Ohtaki, K. Eguchi, H. Arai, *J. Mol. Catal. A Chem.* 1998, 129, 61-68.

[10] G. Lu, S. Li, Z. Guo, O. K. Farha, B. G. Hauser, X. Qi, Y. Wang, X. Wang, S. Han, X. Liu, J. S. DuChene, H. Zhang, Q. Zhang, X. Chen, J. Ma, S. C. J. Loo, W. D. Wei, Y. Yang, J. T. Hupp, F. Huo, *Nat. Chem.* 2012, 4, 310-316.

[11] T. T. Isimjan, H. Kazemian, S. Rohani, A. K. Ray, *J. Mater. Chem.* 2010, 20, 10241-10245.

[12] R. Vinu, G. Madras, *J. Indian Inst. Sci.* 2010, 90, 189-230.

[13] A. Kar, A. Patra, *J. Mater. Chem. C* 2014, 2, 6706-6722.

[14] A. Kar, S. Sain, D. Rossouw, B. R. Knappett, S. K. Pradhan, A. E. H. Wheatley, *Nanoscale* 2016, 8, 2727-2739.

[15] J. Cravillon, R. Nayuk, S. Springer, A. Feldhoff, K. Huber, M. Wiebcke, *Chem. Mater.* 2011, 23, 2130-2141.

[16] Y.-d. Wang, C.-l. Ma, X.-d. Sun, H.-d. Li, *Nanotechnology* 2002, 13, 565-569.

[17] M. Zahmakiran, *Dalton Trans.* 2012, 41, 12690-12696.

[18] X. Zhao, X. Bu, T. Wu, S.-T. Zheng, L. Wang, P. Feng, *Nat. Commun.* 2013, 4, 2344-2352.

[19] A. Houas, H. Lachheb, M. Ksibi, E. Elalouui, C. Guillard, J.-M. Herrmann, *Appl. Catal. B Environ.* 2001, 31, 145-157.

[20] C. Tian, Q. Zhang, A. Wu, M. Jiang, Z. Liang, B. Jiang, H. Fu, *Chem. Commun.* 2012, 48, 2858-2860.

[21] T. Borjigin, F. Sun, J. Zhang, K. Cai, H. Ren, G. Zhu, *Chem. Commun.* 2012, 48, 7613-7615.

[22] P. Horcajada, T. Chalati, C. Serre, B. Gillet, C. Sebrie, T. Baati, J. F. Eubank, D. Heurtaux, P. Clayette, C. Kreuz, J.-S. Chang, Y. K. Hwang, V. Marsaud, P.-N. Bories, L. Cynober, S. Gil, G. Ferey, P. Couvreur, R. Gref, *Nat. Mater.* 2010, 9, 172-178.

[23] J. Silvestre, N. Silvestre, J. De Brito, *J. Nanomater.* 2015, 2015, 106494-106507.

[24] A. Kar, S. Kundu, A. Patra, *J. Phys. Chem. C,* 2011, 115, 118-124.

[S1] J. Tan, T. D. Bennett, A. K. Cheetham, Proc. Natl. Acad. Sci. U.S.A 2010, 107, 9938.

[S2] J. C. Tan, B. Civalleri, C. C. Lin, L. Valenzano, R. Galvelis, P. F. Chen, T. D. Bennett, C. Mellot-Draznieks, C. M. Zicovich-Wilson, A. K. Cheetham, Phys. Rev. Lett. 2012, 108, 1.

[S3] X. Xu, J. Zhuang, X. Wang, J. Am. Chem. Soc. 2008, 130, 12527.

[S4] G. Williamson, W. Hall, Acta Metall. 1953, 1, 22.

[S5] A. Kar, S. Sain, D. Rossouw, B. R. Knappett, S. K. Pradhan, A. E. H. Wheatley, Nanoscale 2016, 8, 2727.

[S6] M. Jian, B. Liu, G. Zhang, R. Liu, X. Zhang, Colloids Surfaces A Physicochem. Eng. Asp. 2015, 465, 67.

[S7] J.-C. Dupin, D. Gonbeau, P. Vinatier, A. Levasseur, Phys. Chem. Chem. Phys. 2000, 2, 1319.

[S8] L. Cao, H. Wan, L. Huo, S. Xi, J. Colloid Interface Sci. 2001, 244, 97.

[S9] M. Fuentes-Cabrera, D. M. Nicholson, B. G. Sumpter, M. Widom, J. Chem. Phys. 2005, 123, DOI 10.1063/1.2037587.

[S10] M. A. Nasalevich, M. van der Veen, F. Kapteijn, J. Gascon, CrystEngComm 2014, 16, 4919.

[S11] H.-P. Jing, C.-C. Wang, Y.-W. Zhang, P. Wang, R. Li, RSC Adv. 2014, 4, 54454.

[S12] L. Sun, M. G. Campbell, M. Dince, Angew. Chemie—Int. Ed. 2016, 55, 3566.

[S13] F. Wang, Z.-S. Liu, H. Yang, Y.-X. Tan, J. Zhang, Angew. Chemie 2011, 123, 470.

[S14] S. Wu, H. Cao, S. Yin, X. Liu, X. Zhang, J. Phys. Chem. C 2009, 113, 17893.

[S15] B. Esen, T. Yumak, A. Sinağ, T. Yildiz, Photochem. Photobiol. 2011, 87, 267.

[S16] R. Vinu, G. Madras, J. Indian Inst. Sci. 2010, 90, 189.

[S17] B. K. Kandola, D. Deli, in Polym. Green Flame Retard. (Eds.: C.D. Papaspyrides, P. Kiliaris), Elsevier, Oxford, 2014, pp. 503-549.

[S18] I. B. Vasconcelos, T. G. Da Silva, G. C. G. Militão, T. a. Soares, N. M. Rodrigues, M. O. Rodrigues, N. B. Da Costa, R. O. Freire, S. A. Junior, RSC Adv. 2012, 2, 9437.

[S19] S. Blessi, M. M. L. Sonia, S. Vijayalakshmi, S. Pauline, Int. J. chem Tech Res. 2014, 6, 2153.

[S20] Q. Li, X. Yuan, G. Zeng, Shiquan Xi, Mater. Chem. Phys. 1997, 47, 239.

[S21] Y. Wang, L. Tan, L. Wang, J. Nanomater. 2011, 2011, DOI 10.1155/2011/529874.

[S22] J. Zhang, L. Gao, J. Solid State Chem. 2004, 177, 1425.

[S23] Y. Shen, Y. Zhang, Q. Zhang, L. Niu, T. You, A. Ivaska, Chem Commun 2005, 4193.

[S24] M. He, J. Yao, Q. Liu, K. Wang, F. Chen, H. Wang, Microporous Mesoporous Mater. 2014, 184, 55.

[S25] Y. Hu, H. Kazemian, S. Rohani, Y. Huang, Y. Song, Chem. Commun. (Camb). 2011, 47, 12694.

[S26] C. H. Rochester, G. H. Yong, J. Chem. Soc., Faraday Trans. 1 1980, 76, 1158.

[S27] R. Zuo, G. Du, W. Zhang, L. Liu, Y. Liu, L. Mei, Z. Li, 2014, 2014, 1.

[S28] N. Serpone and A. Salarino, "TERMINOLOGY, RELATIVE PHOTONIC EFFICIENCIES AND QUANTUM YIELDS IN HETEROGENEOUS PHOTOCATALYSIS. PART I: SUGGESTED PROTOCOL" Pure & Appl. Chem., Vol. 71, No. 2, pp. 303-320, 1999.

[S29] Kar et al. (2016), *Nanoscale*, 2016, 8, 2727-2739.

The invention claimed is:

1. A process for manufacturing a monolithic metal-organic framework (MOF) composite body, the process comprising the steps:

providing MOF precursors;
providing nanoparticles having an average particle size corresponding to an average particle diameter in the range 3-200 nm;
providing at least one solvent;
allowing the reaction of the MOF precursors in the solvent in the presence of the nanoparticles;
carrying out a drying stage with a maximum temperature in the drying stage of not more than 80° C. to form a monolithic MOF composite body having a smallest dimension of at least 1 mm, the MOF composite body comprising MOF crystallites adhered to each other via a binder comprising MOF, and incorporating at least 0.15 vol % and at most 1 vol % of the nanoparticles encapsulated in MOF.

2. The process according to claim 1 wherein the drying stage is carried out in a mold so that the composite body is formed to conform to an internal shape of the mold.

3. The process according to claim 1 wherein the nanoparticles are photocatalytic nanoparticles.

4. The process for manufacturing a monolithic MOF composite body according to claim 1 wherein the relative photonic efficiency $\xi$ of the nanoparticles is greater than 1, relative photonic efficiency $\xi_r$ of the nanoparticles being defined as:

$\xi_r = R^{in}(\text{nanoparticles})/R^{in}(P25)$ wherein $R^{in}(P25)$ is the initial rate of degradation of 200 μM phenol in an air-equilibrated aqueous dispersion by standard titania particles (Degussa P-25 $TiO_2$) at 2 g/L under AM1 simulated sunlight radiation, and $R^{in}(\text{nanoparticles})$ is the initial rate of degradation of 200 μM phenol in an air-equilibrated aqueous dispersion by the nanoparticles (isolated from the MOF of the composite body) at 2 g/L under AM1 simulated sunlight radiation.

5. The process for manufacturing a monolithic MOF composite body according to claim 1 wherein the nanoparticles comprise a composition selected from the group consisting of: one or a combination of: $SnO_2$, ZnO, $TiO_2$, PdO, Pd, Au, Ru, Rh, Pt, $BiFeO_3$, $Bi_2S_3$, $BiVO_4$, $Bi_2Fe_3O_9$, CdSe, CdS, $MoS_2$ and $WS_2$.

6. The process for manufacturing a monolithic MOF composite body according to claim 5 wherein the nanoparticles comprise at least two different materials having a heterojunction interface between them.

7. The process for manufacturing a monolithic MOF composite body according to claim 1 having a BET surface area of at least 500 $m^2g^{-1}$, and optionally wherein the nanoparticles, when isolated from the MOF composite body have a BET surface area of at most 100 $m^2g^{-1}$, BET surface area being determined based on the N2 adsorption isotherm at 77K.

8. The process for manufacturing a monolithic MOF composite body according to claim 1 wherein the MOF comprises one or more materials selected from the group consisting of: ZIF-8, HKUST-1, UiO-66, MOF-74, Al-fumarate, NU-1000, MIL-100, MIL-53.

* * * * *